United States Patent [19]

Hubred et al.

[11] 4,083,915
[45] Apr. 11, 1978

[54] COBALT STRIPPING PROCESS

[75] Inventors: Gale L. Hubred, Lexington; Roger N. Kust, Acton; David L. Natwig, Brighton; J. Paul Pemsler, Lexington, all of Mass.

[73] Assignee: Kennecott Copper Corporation, New York, N.Y.

[21] Appl. No.: 633,852

[22] Filed: Nov. 20, 1975

[51] Int. Cl.² .................... C01G 3/00; C01G 51/00; C01G 53/00
[52] U.S. Cl. ........................ 423/24; 423/32; 423/49; 423/139; 423/150; 423/DIG. 4
[58] Field of Search .............. 423/24, 139, 32, 49; 75/101 BE, 108, 117, 119, 103

[56] References Cited

U.S. PATENT DOCUMENTS

| | | | |
|---|---|---|---|
| 3,276,863 | 10/1966 | Drobnick | 423/139 |
| 3,348,906 | 10/1967 | Henrickson | 423/63 |
| 3,761,249 | 9/1973 | Ritcey | 423/24 |
| 3,770,630 | 11/1973 | Kamperman | 75/108 |
| 3,849,534 | 11/1974 | Skarbo | 423/139 |
| 3,929,468 | 12/1975 | Siemens et al. | 423/139 |
| 3,950,487 | 4/1976 | Pemsler et al. | 423/139 |

OTHER PUBLICATIONS

Hummelstedt, et al., "Use of Extractant Mixtures Containing Kelex 100 for Separation of Nickel (II) and Cobalt (II)," in Solvent Extraction, Society of Chemical Industry, London, 1974, vol. I, pp. 829–841.
Ritcey, et al., CIM Bulletin, Feb. 1975, pp. 105–113.
Ritcey, et al., Proceedings International Solvent Extraction Conference, 1971, Society of Chemical Industry, London, 1971, pp. 463–475.
Evans, et al., (Eds), International Symposium on Hydrometallurgy, Chicago, Ill., AIME, New York, 1973, pp. 554–559, 562, 563, 568–571.

Primary Examiner—O. R. Vertiz
Assistant Examiner—Brian E. Hearn
Attorney, Agent, or Firm—John L. Sniado; Anthony M. Lorusso

[57] ABSTRACT

After the non-cobalt values are stripped from the co-loaded organic, the cobalt ions on the organic are reduced to the divalent state. The organic loaded with divalent cobalt ions is easily stripped with a dilute acid to render the organic recyclable.

In another embodiment of the invention simultaneous reduction and "crowding" is utilized to strip cobalt from the organic. In this embodiment, a convenient source of both reductant $Cu^+$ and of copper and/or nickel such as pregnant leach liquor is used to crowd the reduced cobalt from the organic.

48 Claims, 9 Drawing Figures

COBALT STRIPPING PROCESS

BACKGROUND OF THE INVENTION

There are many processes for extracting metal values from ores in which ores that contain metals such as copper, nickel and cobalt are first leached and are then subjected to selective extraction to recover the various metals in the ore. An example of such a process is the so called, "Cuprion Process" which is disclosed in U.S. Patent application Ser. No. 311,063 entitled "Recovery of Metal Values from Manganese Deep Sea Nodules," filed Dec. 1, 1972, now abandoned in favor of continuation-in-part application Ser. No. 548,430, filed Feb. 10, 1975 the teachings of which are incorporated herein by reference.

A problem which often occurs when treating ores containing copper, nickel and cobalt is that the cobalt can build up to intolerable levels on the organic extractant as other metals are extracted. Indeed, the stripping of cobalt from organic extractant is a problem that has plagued the industry. In connection with the foregoing, the various stripping processes known for stripping cobalt from organic extractants involve conditions under which the organic extractant is partially destroyed. Of course, destroying the organic extractant increases the cost of solvent extraction and should be avoided.

It is generally known that divalent cobalt is readily extracted on to oximes from ammoniacal leach solutions. However, as is stated above, cobalt is not readily stripped from the organic oxime extractant. U.S. Pat. No. 3,276,863 to Drobnick et al, entitled "Separation of Nickel and Cobalt Values Using α-hydroxy Oximes" teaches that one way to selectively extract nickel from an ammoniacal solution containing cobalt and nickel is to oxidize the cobalt values in the aqueous solution to the trivalent state and then contact the resulting solution with a liquid oxime extractant to extract the nickel values therefrom. Indeed, Column 5, Line 13 et seq. of the Drobnick patent teaches:

"This example shows that as aeration or oxidation period is increased (cobalt oxidized to trivalent state) the percent extraction of nickel increases greatly and the percent cobalt extraction is reduced to substantially negligible amount. Continuation of the aeration period reduces the cobalt extraction to zero and further increases the nickel extraction."

At this point it should be noted that numerous tests have indicated that it is impossible to completely eliminate cobalt extraction when extracting with oximes from ammoniacal leach liquors. Indeed, oxidized cobalt is slowly extracted by oximes. Stated another way, although oxidation reduces the percentage of cobalt that is extracted for a given contact time with a cobalt bearing solution, oxidation does not completely prevent cobalt extraction. This fact creates a considerable problem because extracted cobalt builds up as the organic extractant is continuously recycled and is difficult to strip.

It has been generally assumed that since the divalent species of cobalt is the species which readily extracts, it is the divalent species that is complexed in the organic. In accordance with the present invention, however, it has been discovered that although the divalent cobalt ions readily extract into organics such as oximes, once extracted the cobalt is rapidly oxidized to the trivalent state in the presence of air. The trivalent cobalt complex, which is characteristically dark brown in color, is so stable that it is almost impossible to strip off the organic with dilute mineral acids. However, the divalent cobalt complex, which is characteristically yellow in color when extracted into the organic in the absence of air, is easily stripped off the organic with dilute mineral acids.

SUMMARY OF THE INVENTION

In accordance with the present invention, extracted cobalt is reduced while on the organic extractant to render the cobalt strippable with a dilute mineral acid. On the other hand, to maintain the cobalt values on the organic when other metal values are stripped therefrom, the cobalt is purposely oxidized to prevent it from being stripped with dilute mineral acids.

Accordingly, an object of the present invention is to provide a new and improved process for extracting and stripping cobalt from an aqueous leach liquor.

A further object of the present invention is to provide a process for stripping cobalt from an organic extractant on which it is loaded which will not destroy the organic.

A further object of the present invention is to provide a process for selectively stripping cobalt from an organic extractant co-loaded with cobalt and other metals such as copper and nickel.

A further object of the present invention is to provide a process in which cobalt, which has been extracted by an organic extractant such as an oxime, is purposely reduced or maintained in the reduced state to render it strippable with a dilute acid.

Yet another object of the present invention is to provide a process in which cobalt, which has been extracted by an organic extractant such as an oxime, is purposely oxidized while on the oxime so that the cobalt will not be stripped when other metal values, such as copper and nickel which have been co-extracted with the oxime, are stripped with a dilute mineral acid.

DESCRIPTION OF THE PREFERRED EMBODIMENTS

Figure 1:
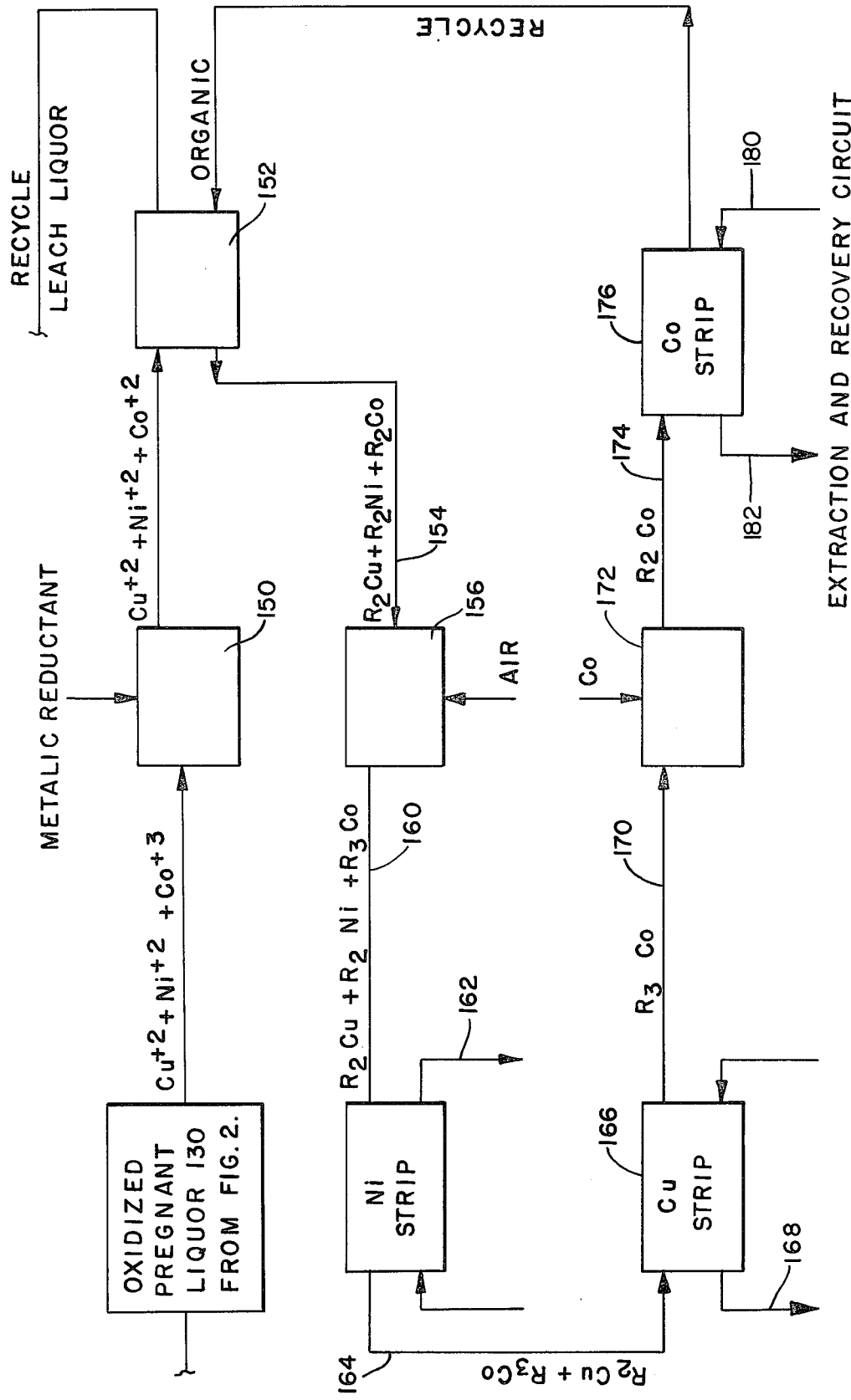
FIG. 1 is a schematic flow sheet illustrating the extraction and separation of copper, nickel and cobalt metal values from the reduced ammoniacal leach liquors containing these values.

At the outset the process of the present invention is described in its broadest overall aspects with a more detailed description following. The process of the present invention is bottomed on the discovery that the reason why extracted cobalt values are difficult to strip from an organic extractant without destroying the organic is that the divalent cobalt ions, which are readily extractable, immediately oxidize to trivalent cobalt on the organic in the presence of air; and, the trivalent cobalt is difficult to strip from the organic extractant. However, if the cobalt is stripped from the organic extractant while in its divalent state, it can be stripped with dilute mineral acids without the destruction of the organic extractant.

There are many applications for the process of the present invention. For example, if the leach liquor contains only cobalt ions; then, the leach liquor can be reduced to place the cobalt ions in a divalent state and contacted with an extractant while the cobalt is in a divalent state to load the cobalt values onto the extractant. To render the cobalt values strippable with a dilute mineral acid, the extraction is conducted in a non-oxidizing or reducing atmosphere and subsequently the cobalt on the organic is stripped in a non-oxidizing or reducing atmosphere.

If the ammoniacal leach liquor contains cobalt and nickel, the leach liquor can be reduced to render both the cobalt and nickel extractable. Once the extractant is co-loaded with cobalt and nickel, the metals on the extractant can be air oxidized to purposely convert the divalent cobalt loaded on the organic to the trivalent state. Thereafter, the nickel can be stripped with a dilute mineral acid and the cobalt will remain on the organic. Once all the nickel is removed, the cobalt ions on the organic can be reduced to convert the trivalent cobalt back to the divalent state and subsequently contacted with a dilute mineral acid to remove the reduced cobalt therefrom.

If the ammoniacal leach liquor contains copper as well as nickel and cobalt; then, the leach liquor can be oxidized to place the copper values in the divalent state from which they are readily extractable. The oxidation can be accomplished with air. To reduce the cobalt values from the trivalent to the divalent state, without reducing the cupric ions, a metallic reductant such as cobalt powder or nickel powder can be added to the oxidized leach liquor. The metallic reductant will reduce the cobalt in the leach liquor to the divalent state; thus, rendering the copper, nickel and cobalt extractable by an oxime ion extractant. The loaded oxime can then be oxidized to prevent the cobalt values from being stripped readily. The nickel and copper can be stripped selectively from the oxime with dilute acid in accordance with known technology. Once the nickel and the copper are removed from the oxime, the trivalent cobalt on the oxime can be reduced to render these values strippable with a dilute acid.

The extracting and stripping scheme can be employed in conjunction with any extractant capable of extracting cobalt from a leach liquor. If the extractant has cobalt values loaded on it, the cobalt will be easily stripped if retained in a divalent state; while on the other hand, the cobalt ions will be difficult to strip if they are oxidized to the trivalent state. Thus, the extractants which can be used to recover cobalt from a leach liquor in accordance with the present invention include by way of example, oximes and quinoline derivatives.

Of course, a significant application for the process of the present invention is in those situations where the leach liquor contains other base metals in addition to cobalt. For example, the process of the present invention can be employed to great advantage for separating copper, nickel and cobalt from each other and from an ammoniacal solution into which they have been leached. In such circumstances the process of the present invention can be advantageously employed in conjunction with an oxime or dioxime organic extractant.

The oximes referred to herein may be for example $\alpha$-hydroxy oximes, substituted hydroxy benzophenoximes, and mixtures thereof.

The $\alpha$-hydroxy oxime component has the general formula:

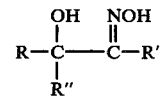

where R, R' and R" may be any of a variety of organic hydrocarbon radicals such as aliphatic and alkyaryl radicals. R" may also be hydrogen. Preferably, R and R' are unsaturated hydrocarbons or branched chain alkyl groups, containing from about 6 to 20 carbon atoms, R and R' are also preferably the same and, when alkyl, are preferably attached to the carbons substituted with the —OH and =NOH groups through a secondary carbon atom. It is also preferred that R" is hydrogen or unsaturated hydrocarbon or branched chain alkyl groups containing from about 6 to 20 carbon atoms. The $\alpha$-hydroxy oximes also preferably contain a total of about 14 to 40 carbon atoms. Representative compounds are 19-hydroxyhexatriaconta-9, 27-dien-18-oxime, 5-10-diethyl-8 hydroxy-tetradecan-7-oxime, and 5,8-diethly-7-hydroxy-dodecane-6-oxime. The latter compound has the following structural formula:

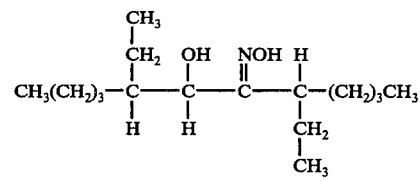

Representative of other mono- and polyunsaturated radicals are heptenyl, octenyl, decenyl, octadecenyl, and alkyl substituted radicals such as ethyloctodecenyl. Representative of other mono- and polyalkyl substituted saturated radicals are ethylhexyl, diethylheptyl, butyldecyl, butylhexadecyl, ethylbutyldodecyl, butylcyclohexyl and the like.

The $\alpha$-hydroxy oxime component is also characterized as having a solubility of at least 2% by weight in the hydrocarbon solvent used to make up the organic phase and substantially complete insolubility in water.

The $\alpha$-hydroxy oximes are prepared by reacting an acyloin with a hydroxylamine salt under reflux conditions. Such reaction can be carried out by refluxing the reactants in an alcohol such as ethanol and adding pyridine to combine with the acid associated with the hydroxylamine.

The substituted benzophenoximes useful in the present invention have the following formula:

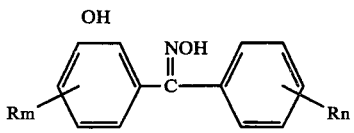

in which R and R' may be individually alike or different and are saturated aliphatic groups, ethylenically unsaturated aliphatic groups or saturated or ethylenically unsaturated aliphatic ether groups (i.e. - OR") and $m$ and $n$ are 0, 1, 2, 3 or 4 with the proviso that $m$ and $n$ are not both 0. The total number of carbon atoms in $R_m$ and $R'_n$ is from 3–24. R and R' contain 1 to 25 carbon atoms when saturated aliphatic and 3 to 25 carbon atoms when they are ethylenically unsaturated groups. Preferably, the position ortho to the phenolic OH substituted carbon atom is unsubstituted and also preferably the positions ortho to the oxime carbon atom on the other aromatic nucleus are unsubstituted. Branched chain saturated aliphatic hydrocarbon substituents are preferred. Compounds of the above type useful in the present invention include the following:

2-hydroxy-3'-methyl-5-ethylbenzophenoxime
2-hydroxy-5-(1,1-dimethylpropyl)-benzophenoxime
2-hydroxy-5-(1,1-dimethylethyl) benzophenoxime
2-hydroxy-5-octylbenzophenoxime
2-hydroxy-5-nonyl-benzophenoxime
2-hydroxy-5-dodecyl-benzopehnoxime
2-hydroxy-2',4'-dimethyl-5-octylbenzophenoxime
2-hydroxy-2',3',5'-trimethyl-5-octylbenzophenoxime
2-hydroxy-3,5-dinonylbenzophenoxime
2-hydroxy-4'-(1,1-dimethylethyl-5-(2-pentyl)-benzophenoxime
2-hydroxy-4'-(1,1-dimethylethyl-5-(2-butyl-benzophenoxime
2-hydroxy-4-dodecyloxybenzophenoxime
2-hydroxy-4'-(1,1-dimethylethyl)-5-methyl-benzophenoxime
2-hydroxy-4',5-bis-(1,1-dimethylethyl)benzophenoxime It has been found that when the α-hydroxy aliphatic oximes are employed in combination with the 2-hydroxy benzophenoximes described the extractions are improved.

The relative amounts of the two extractants in the compositions of the present invention can be varied widely as examples hereinafter will demonstrate. Even minute quantities of the α - hydroxy aliphatic oxime are beneficial. However, it is preferred to employ it in the range of 1 to 100% by weight based on the weight of the 2-hydroxy benzophenoxime, with best result obtainable in the range of 15–50%. The amount of the extractants in the organic solvent likewise can vary within considerable limits. In general, however, the concentration of total oxime is in the range 2–25%, based on the weight of the organic extracting solution, preferably in the range of 5–15%.

These and other suitable oximes are disclosed for example by U.S. Pat. Nos. 3,224,873, 3,592,775, 3,455,680, 3,428,499, 3,276,863 and 3,197,274. Particularly suitable extractants comprise 2-hydroxy-4-nonyl-benzophenoxime which is the primary extractant in a composition also containing an α - hydroxy oxime sold by General Mills, Inc. under the trade name LIX-64N; 5,8-diethyl-7-hydroxy-6-dodecanone oxime which is the primary extractant in a composition sold by General Mills, Inc. under the trade name LIX-63; and 2-hydroxy-4-dodecyl-benzophenoxime which is the primary extractant in a composition also containing an α-hydroxy oxime sold by General Mills, Inc. under the trade name LIX-64.

Another oxime which is usable in accordance with the present invention is sold by the Shell Oil Corporation under the trade name "Shell 529" and has the following structural formula:

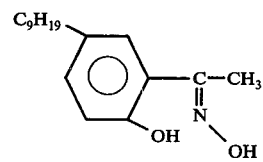

Other extractants which can be used to extract divalent cobalt, divalent copper and nickel values include Kelex 100 and Kelex 120. Kelex is an Ashland Chemical Company trade name for an extractant which is a α - alkenyl substituted 8-hydroxyquinoline of the general formula:

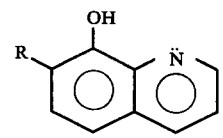

The invention is further illustrated by the following non-limiting examples.

EXAMPLE 1

A 20 ml sample of an ammoniacal leach liquor containing 150 g/l of ammonia and 88 g/l of carbon dioxide was added to a test tube and purged with argon to displace dissolved oxygen and air. Five tenths of a gram of cobalt powder was added to the test tube along with about 15 ml of a sample of LIX-64N loaded with 1 g/l of cobalt. After again purging with argon, the tube was tightly capped and brought to 40° C and intermittently shaken to contact the three phases. After approximately 10 minutes, the LIX-64N had become transparent, an indication that up to 95% of the trivalent cobalt had been reduced. Upon recontacting the organic with air, it immediately reverted to the oxidized trivalent state.

EXAMPLE 2

The procedure of Example 1 was repeated using granular zinc instead of cobalt powder. After shaking for 5–10 minutes at room temperature approximately 100% cobalt reduction was achieved as evidence by the yellow color of the LIX-64N. A portion of the organic was then transferred to another argon-purged tube where it was contacted with a strip solution containing 200 g/l sulfuric acid. Approximately 100% of the cobalt was stripped into the aqueous phase at room temperature and at a contact time of less than 1 minute.

It should be noted that the present invention can involve atmosphere controls at two points in the system. The first point is in the extraction circuit.

In the extraction circuit, if it is desired to extract cobalt, the cobalt should be in the reduced state. If the cobalt in the leach liquor is already in the reduced state, such as it might be in the so called "cuprion process", then the atmosphere in the cobalt extraction circuit should be a non-oxidizing or a neutral atmosphere to prevent oxidation of the cobalt values. Thus, an atmosphere of nitrogen, or an inert gas is acceptable at this point of the process. Of course, the atmosphere can be a reducing gas; but, only a non-oxidizing or neutral atmosphere is necessary. If the cobalt has been oxidized then it is necessary to reduce the cobalt in the extraction circuit. In this case a reducing agent must be added to the leach liquor and the atmosphere must be maintained in a neutral or non-oxidizing state. It is of course preferred to use a metallic reducing agent to reduce the oxidized cobalt.

The second point in the system where the atmosphere becomes significant is in the stripping circuit. In the stripping circuit, it is preferred to use a neutral or non-oxidizing atmosphere such as argon and to add a metallic reductant that can be recovered to reduce the cobalt loaded on the extractant. Reductant which can be utilized in the present invention include: $Cu^+$ ion, cobalt powder, zinc powder, copper powder, nickel powder, iron powder, stannous ions, manganous ions, ferrous ions, sulfurous acid and hypophosphorous acid.

The basic procedure for calculating the amount of reductant needed is made on the premise that one mole of electrons should be provided for every mole of cobalt on the organic plus any excess need for efficiency. The formula for calculating the amount of reductant needed to convert $Co^{+3}$ to $Co^{+2}$ appears below:

grams reductant for 1 liter organic =

$$\left( \frac{\text{Organic cobalt concentration g/l}}{58.9 \text{ g/mole}} \right) (X \text{ g/mole}) (1l)$$

In the above formula, X is the molecular equivalent of the reductant used. Thus, for cuprous ion, X is 63.5; however, for zinc, X would be 65.37/2.

$$X = 63.5 \text{ for } Cu^+ \rightarrow Cu^{++}$$

$$X = \frac{65.37}{2} \text{ for } Zn \rightarrow Zn^{++}$$

As has been stated above, it is preferred to use as a reductant form of a metal that is in the leach liquor and which is one of the metals that is ultimately being recovered.

As it has been stated above, there are many processes for leaching base metals such as copper and nickel with ammoniacal leach liquors and one important example of such a process is the so called "Cuprion Process" which is disclosed in U.S. Patent Application Ser. No. 548,430, the teachings of which are incorporated herein by reference. In that process, copper, nickel, cobalt and molybdenum are recovered by leaching manganese nodules with an aqueous ammoniacal leach liquor containing cuprous ions.

Ocean floor deposits are found as nodules, loose-lying at the surface of the soft sea floor sediment, as grains in the sea floor sediments, as crusts on ocean floor hard rock outcrops, as replacement fillings in calcareous debris and animal remains, and in other less important forms. Samples of this ore material can readily be recovered on the ocean floor by drag dredging, a method used by oceanographers for many years, or by deep sea hydraulic dredging, a method that could be used in commercial operations to mine these deposits. Mechanical deep sea nodule harvesters are described in U.S. Pat. Nos. 3,480,326 and 3,504,943.

The character and chemical content of the deep sea nodules may vary widely depending upon the region from which the nodules are obtained. The Mineral Resources of the Sea, John L. Mero, Elsevier Oceanography Series, Elsevier Publishing Company, 1965, discusses on pages 127–241 various aspects of manganese nodules. For a detailed chemical analysis of nodules from the Pacific Ocean see pages 449–450 in the Encyclopedia of Oceanography, edited by R. W. Fairbridge, Reinhold Publishing Corp., N.Y. 1966, 1 and U.S. Pat. No. 3,169,856. For the purpose of this invention, the complex ores will be considered as containing the following approximate metal content range on a dry basis:

| METAL CONTENT ANALYSIS RANGE | |
|---|---|
| Copper | 0.8 – 1.8% |
| Nickel | 1.0 – 2.0% |
| Cobalt | 0.1 – 0.5% |
| Molybdenum | 0.03 – 0.1% |
| Manganese | 10.0 – 40.0% |
| Iron | 4.0 – 25.0% |

The remainder of the ore consists of oxygen as oxides, clay minerals with lesser amounts of quartz, apatite, biotite, sodium and potassium feldspars and water of hydration. Of the many ingredients making up the manganese nodules, copper, nickel and cobalt are emphasized because, from an economic standpoint, they are the most significant metals in most of the ocean floor ores. The "cuprion process" as disclosed in application Ser. No. 548,430 includes the step of contacting ground manganese nodules with an ammoniacal leach solution containing cuprous ions in a reaction vessel to reduce the manganese oxides in the nodules to enable metal values such as copper, nickel, cobalt and molybdenum to be solubilized. The nodule residue is washed with an ammoniacal ammonium carbonate solution to remove these entrained metal values from the residue and produce a pregnant liquor.

The pregnant liquor contains various metal values including copper, nickel, cobalt and molybdenum which can be recovered in a liquid ion exchange separation circuit in accordance with the extraction scheme of the present invention. In prior practice, initially, the pregnant liquor was oxidized and the copper and nickel were co-extracted by an organic extractant in a series of mixer/settler units. Because the pregnant liquor was oxidized, most of the cobalt remained in the raffinate along with the molybdenum. However, a small amount of cobalt did extract and accumulated on the organic. The copper and nickel free liquor (raffinate) was sent to a storage tank before it was steam stripped to recover ammonia, carbon dioxide, cobalt and molybdenum.

The organic extractant which contained copper and nickel values was washed with an $NH_4HCO_3$ solution followed by an ammonium sulfate solution to remove ammonia picked up during extraction. This scrubbing operation was carried out in another series of mixer settlers. The organic extractant was then stripped with a weak $H_2SO_4$ solution (pH about 3) to preferentially remove nickel. Thereafter, the copper was stripped, which was accomplished by using a stronger (160 g/l) $H_2SO_4$ solution. The copper and nickel free organic extractant was recycled to the metal extraction circuit of the LIX process.

The raffinate which contained only cobalt, molybdenum, zinc and some trace impurities that were not extracted into the organic phase was sent into a surge tank for future processing to recover cobalt and molybdenum. In the cobalt and molybdenum recovery circuit, the ammonia and $CO_2$ were stripped from the raffinate thereby precipitating cobalt. The ammonia and $CO_2$ were condensed and sent back to the process for recycling. The cobalt precipitate was separated from the liquor and the liquor was subsequently treated with hydrated lime to precipitate the molybdenum. The resulting slurry was agitated and then allowed to settle. The solution which no longer contained cobalt and molybdenum was recycled back to the process as fresh wash liquor.

One way of running the "cuprion process" in accordance with the present invention is to air oxidize the leach liquor to place the copper, nickel and cobalt values in their highest oxidation state and subsequently treat it with a metallic reductant, such as cobalt powder, to selectively reduce the cobalt to the divalent state. Thereafter, the leach liquor is contacted with an extractant to extract the copper, nickel and cobalt values. The loaded organic is then air oxidized so that the cobalt on the loaded organic is in the trivalent state and therefore difficult to strip. The nickel and copper are then selectively stripped in the manner described above; and, the organic, which now contains only cobalt, is reduced with cobalt metal to render the cobalt strippable with a dilute mineral acid. Of course, molybdenum, which was not extracted, can be recovered from the recycled leach liquor. The foregoing extraction and stripping scheme is shown schematically in FIG. 1.

Figure 2:
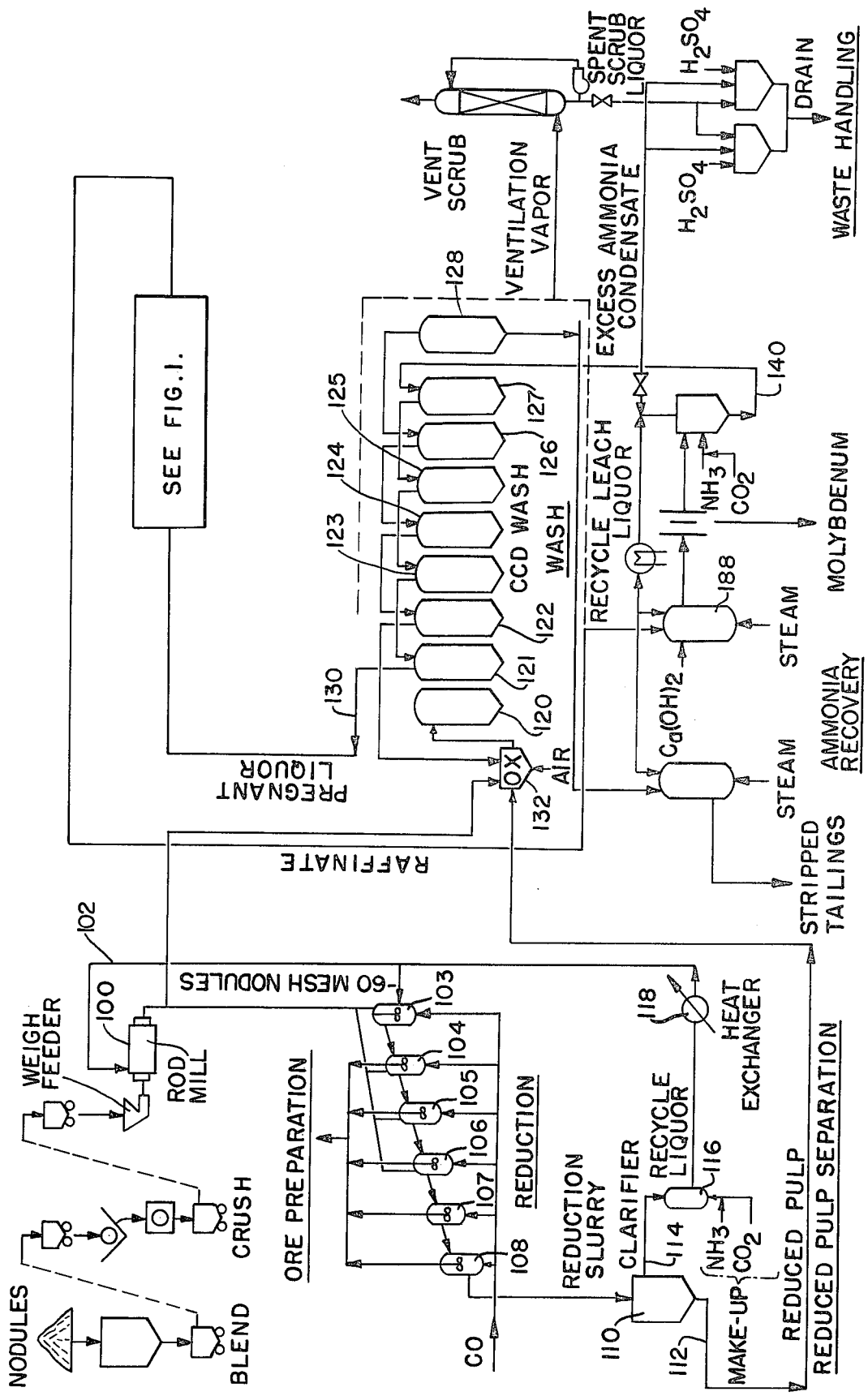
FIG. 2 is a schematic flow sheet illustrating the cuprion embodiment of the present invention.

The cuprion embodiment of the present invention is illustrated by the following example in conjunction with FIGS. 1 and 2. At the outset, however, it is emphasized that the following description relates to a procedure that can be performed in a pilot plant. By extrapolating the results given for the pilot plant, however, one skilled in this art can design a commercial plant for processing large quantities of nodules in accordance with the present invention.

The pilot plant was designed for one half tons per day nodule throughput, based on a 3½ percent solid slurry and with up to a three hour hold-up in the reduction section.

ORE PREPARATION

The nodules utilized in the pilot plant process are received in 55 gallon drums in the condition that they are in after being mined from the deep sea ocean bottom. To facilitate processing in the pilot plant, the nodules are air dried. After they are dried, they are then blended, using the "cone and quarter" technique before going into the primary crushing circuit. The primary crushing circuit consists of a Jacobson "Full Nelson" crusher to reduce the raw nodules to minus one inch. Thereafter, the nodules are passed through a Stedman double row cage mill to reduce the ore further to minus 6 mesh. The nodules are then conveyed away on a belt feeder to drums for storage or further processing.

The second grinding circuit is the final stage of ore preparation before the nodules enter the reduction stage. This circuit consists of a hopper, filled from the drums of cage milled ore, located on top of a hydraulic weigh feeder. The weigh feeder is used to meter nodules at a given rate into an open circuit rod mill 100 for final grinding. The rod mill reduces the nodules from a particle size of minus six mesh to a particle size of approximately minus sixty mesh. As the nodules enter the rod mill, they are wetted with a synthetic sea water which brings the nodules up to approximately 40% moisture. This moisture content corresponds to the moisture which would be present in nodules as they are brought up from the sea bottom. At this point, it should be noted that in commercial operation the nodules would be processed directly after being mined from the ocean bottom; thus, the foregoing steps of drying and wetting the nodules would be unnecessary. However, for purposes of a pilot plant operation, it was found convenient to air dry the nodules and later wet the nodules so that they had a moisture content equivalent to that of freshly mined nodules.

It has been found advantageous to add recycle reduction liquor 102 to the rod mill 100. In a commercial process recycle liquor can be added to the grinding mill in order to provide a liquor to facilitate grinding and reduce the dust problem without introducing more water into the circuit which would cause undesirable dilution. Of course, the recycle reduction liquor is advantageous in maintaining the proper copper concentration in the reduction circuit as well to provide liquor which is useful in the grinding process itself. Details of the recycle liquor circuit are amplified below.

REDUCTION-LEACH

The reduction-leach portion of the pilot plant is the location where the nodules are chemically reacted to make the metals of interest soluble in a strong ammoniacal ammonium carbonate solution. This is accomplished by reducing and converting the $MnO_2$ in the nodules to $MnCO_3$.

After leaving the rod mill, the nodules are passed through a conduit into a vibrator (not shown). The purpose of the vibrator is to remove any tramp material. The vibrator utilized is a Sweco vibrating screen. The material that enters and leaves the vibrator is actually a liquid slurry. Connected to the vibrator is a surge tank (not shown). The purpose of the surge tank is to serve as a storage unit so that the process plant will not have to be shut down in the event that there is a malfunction in some piece of ore preparation machinery. After leaving the surge tank, a feed pump pumps the slurry to the reduction-leach circuit.

The reduction circuit includes six reactors 103–108 connected in series. These reactors are sixty gallon capacity reactors which are used to a 42 gallon capacity in the actual processing. Each reactor is formed of "316" stainless steel and is outfitted with an agitator, pressure gage, level alarm, and gas sparging equipment.

Gas sparging is directed underneath the agitator from the bottom of the reactor where a reduction gas containing 95 percent carbon monoxide and 5 percent hydrogen is introduced. This mixture is used because it is similar to a reduction gas mixture that is available in commercial quantities. Of course, hydrogen is unnecessary in the process. Indeed, the only gas necessary for the process is carbon monoxide. The off gas coming out of the reactors first goes through condensers which remove some of the water in the gases before going to off gas rotometers which give an indication of the amount of gases coming out of a reactor. The off gases go through an ammonia scrubber and are exited to the atmosphere.

The reactors themselves are outfitted with gravity overflows so that there is a cascading system from the first through the sixth reactor.

In one important embodiment of the invention, each of the first four reactors (103–106) is fed an equal amount of feed stock. That is, 25 percent of the slurry being pumped from the ore preparation circuit will go into each of the first four reactors. It should be noted, however, that there are a large number of possible ways of accomplishing multipoint injection. That is, the nodule slurry can be injected into two, three, five or more reactors and the amount of slurry going into any given reactor need not be equal to the amount going into the others. It has been found advantageous, however, that there be no nodule injection into at least the last reactor. That is, each portion of nodules should pass through two stages in progression; therefore, there should be no nodule injection in the last stage. It should be noted that in the pilot plant process there is no nodule injection in the last two stages (107 and 108). Each reactor contains a mechanical impeller to achieve mechanical agitation which disperses the gas and suspends the solids. It has been established that the reaction rate of cuprous ion regeneration is influenced by gas-liquid mass transfer rate of carbon monoxide. The rate is affected primarily by the extent of gas-liquid interfacial area, which is in turn affected by the method used to disperse the gas.

While the nodules are fed to the first four reactors, carbon monoxide is sparged into the bottom of each reactor as required. Preferably the carbon monoxide is sparged into each reactor under pressure so that the pressure in each reactor is between the range of 50–100 lbs/sq. in. The slurry in the fifth and sixth reactors is approximately 3.5 percent solids and the average residence time in the system is twenty minutes per reactor. The slurry overflowing the last reactor is flocculated to enhance settling before entering a clarifier. The clarifier is used to separate the liquid from the solids.

START-UP

The process of the present invention is directed toward a continuous process in which nodules are continuously processed to produce various desirable metals. In order to reach a continuous steady state, the reactor vessels must be loaded with start-up materials. Thus, each of the six reactors are filled with an ammonia-ammonium carbonate solution containing approximately 100 grams per liter total ammonia and between about 15 and 20 grams per liter total carbon dioxide. After the reactors are filled with the ammonia-ammonium carbonate solution, copper metal is added and is partially oxidized. The metal is added as a copper powder and is oxidized to convert some of the copper to cuprous ions. Hydroxyl ions are also produced with the cuprous ions. Enough copper metal is added so that 10 grams per liter copper in solution results. The next step in the start-up procedure is to check the cuprous ion concentration. Thus, the mixture in each reactor is analyzed to make sure that the cuprous ion concentration is at an acceptable level of about 7 grams per liter. If more cuprous ions are needed, this can be accomplished by passing the reducing gas through the bottom of the reactor. The first three reactors have pH loops which consist of a finger pump which pumps the solution to a housing which contains a pH electrode. The pH is then measured in a readout on a control panel. The pH is a valuable control device and can be used to indicate whether or not the carbon dioxide, ammonia or cuprous ions have gone off the specified limits.

After the reactor vessels have been loaded for start-up as set forth above, the manganese nodules are added to the first four reactors. The total rate of feed to the four reactors is about 30 pounds per hour of nodules. As the nodules are being fed into the reactors, carbon monoxide is sparged through the bottom of the reactors under a pressure of about 1–2 psi in at a total rate of about 70 standard cubic foot per hour. At this point it should be noted that the amount of carbon monoxide that is fed into each reactor is controlled by the cuprous ion concentration of the contents of any given reactor. This is determined by analyzing the contents of the reactor periodically. During start-up, this is done every half hour and is continued once an hour while the process is in the steady state.

Approximately 120 gallons per hour of reduction slurry enters the clarifier 110. The solids 112 leave the bottom of the clarifier in the form of a slurry with approximately a 40 percent solids content. The overflow 114 from the clarifier is clear liquid which constitutes the recycle reduction liquor 102. However, after leaving the clarifier, the recycle reduction liquor enters a surge tank (not shown) whereupon it is passed into an ammonia makeup unit 116. Gaseous ammonia and carbon dioxide are sparged into the ammonia makeup unit in order to keep the ammonia and carbon dioxide content of the liquid at a prescribed level. At steady state, that level is approximately 100 grams per liter ammonia and the $CO_2$ content about approximately 25 grams per liter. After leaving the makeup unit, the liquid is pumped by a metering pump through a heat exchanger 118 into the first reactor 103 and the rod mill 100. The heat exchanger removes heat that was generated in process and lowers the temperature of the liquid from about 55° to about 40° C.

OXIDATION AND WASH-LEACH

In the oxidation and wash-leach circuit, the clarifier underflow is combined with second stage wash liquor and the resulting slurry is oxidized with air to convert the cuprous and cobaltous ions in the clarifier underflow to cupric and cobaltic ions to facilitate future processing. The oxidized slurry is then pumped to a countercurrent decantation system (CCD) consisting of seven stages of countercurrent washing units. In the pilot plant, the wash-leach steps are carried out on a batch basis in nine tanks (120 to 128) which are used to simulate a countercurrent wash system. It has been found that a seven reactor countercurrent system is advantageous. However, to simulate a seven reactor system, two extra reactors are necessary because one unit is either being filled or is being emptied. In the wash-leach system, the metal solubilization is completed as the displacement wash process is carried out. Fresh wash liquor 140 is added to the seventh stage of the system as a solution containing 100 grams per liter ammonia and 100 grams per liter carbon dioxide. Liquor is transferred from one tank of the settled slurry every twelve hours to another appropriate tank in the system to affect the countercurrent washing. The carbon dioxide concentration varies throughout the washing system and exits in the pregnant liquor which contains approximately 65 grams per liter $CO_2$. This decrease in $CO_2$ concentration is due to the fact that the slurry entering the oxidation and wash-leach circuit has a liquor phase which contains only 25 grams per liter $CO_2$. Pregnant liquor 130 containing the metal to be recovered, is decanted from the first wash stage and pumped to a surge tank (not shown). Fresh ammonia solution without metals is added (not shown) to the last solids wash stage 121. The metal values in solution range from approximately 0 in the fresh wash liquor to between 4-8 grams per liter copper, 5-10 grams per liter nickel and 0.1 + 1.0 grams per liter cobalt in the pregnant liquor. Of course, other metal values are also present in the pregnant liquor but nickel, copper and cobalt are the major metal values of interest.

After the wash-leach step, the pregnant metal bearing liquor is piped off for further processing as is explained below. The second stage wash is recycled back to the oxidation reaction 132. The tailings, which are nothing more than reduced nodules washed of most of their non-ferrous metal values and with the manganese converted to manganese carbonate, are sent to a surge tank (not shown). From the surge tank, they are then pumped to a steam stripping operation where the ammonia and $CO_2$ are driven off. The tailings are then drummed. The ammonia and $CO_2$ obtained in the steam stripper may be recycled.

EXTRACTION AND RECOVERY

In the extraction and recovery circuit, the object is to separate copper, nickel, cobalt and molybdenum from each other and from the pregnant liquor and also recover the ammonia and carbon dioxide in the leach liquor so that the leach liquor can be recycled. In one embodiment of the present invention, leach liquor 130 which has been oxidized in oxidation reactor 132 is introduced into a reactor 150 where a sufficient amount of a metallic reductant is added to place the trivalent cobalt in the divalent state. At this point is should be again noted that prior to entering reactor 150 the pregnant liquor 130 has been sufficiently oxidized to place the copper ions in the divalent state and the cobalt ions in the trivalent state. The preferred metallic reductants are cuprous ions and cobalt powder.

After leaving reactor 150, the leach liquor is contacted with an organic extractant in a series of mixer/settlers represented schematically by block 152. LIX-64N in a kerosene base can be advantageously employed as the organic. The proportion of organic to kerosene is 40% by volume LIX 64N. The organic to aqueous ratio employed in the mixer/settlers 152 is 1 to 1. It is advantageous to utilize three mixer/settler units in stage 152. After leaving stage 152, the loaded organic 154 is introduced into an oxidation reactor 156 where the cobalt on the organic is oxidized to the trivalent state by bubbling air through the organic until oxidation is complete. The oxidation of divalent cobalt to trivalent cobalt is extremely rapid when the cobalt is contacted with air.

After leaving oxidation reactor 156, organic stream 160 is flowed into a nickel strip circuit. Of course, as is well known in this art, the organic extractant can be washed with ammonium bicarbonate solution followed by ammonium sulfate solution to remove ammonia picked up during extraction. The organic extractant 160 is stripped with a weak $H_2SO_4$ solution (pH about 3) to preferentially remove nickel. The nicekl rich strip solution 162 is then sent to nickel electrowinning for recovery of nickel. It should be noted that the details of nickel stripping and nickel electrowinning are conventional and form no part of the invention. The nickel depleted organic stream 164 is then sent to a copper strip circuit 166 where the copper is stripped with a sulfuric acid solution containing 160 grams per liter $H_2SO_4$. The copper in the copper rich aqueous stream 168 is recovered by electrowinning. Organic stream 170 leaving the copper stripping circuit is loaded with trivalent cobalt and is flowed into a reactor 172 where the trivalent cobalt on the organic is reduced with cobalt powder or other reductants in a neutral or non-oxidizing atmosphere.

The organic stream 174 containing divalent cobalt is then flowed into a cobalt stripping circuit 176. Cobalt can be stripped from extractants such as LIX 64N if it is maintained in the cobaltous state or if the oxidized compound is reduced before stripping; therefore, air must be excluded during the entire reduction and stripping process to effectively remove the cobalt. A 200 g/l sulfuric acid stream 180 will strip a cobaltous oxime compound and produce a stream 182 from which the cobalt can be recovered.

There are many ways for recovering cobalt from strip liquor 182. Electrowinning, for example, can be employed when the cobalt is stripped with dilute sulfuric acid. These details, however, are well known in the art and form no part of the present invention.

The organic leaving the cobalt stripping circuit 176 is recycled to extraction stage 152. The recycled leach liquor from which copper, nickel and cobalt have been extracted may be treated to recover molybdenum therefrom. One method of recovering molybdenum from the copper, nickel and cobalt barren raffinate is to add hydrated lime in stage 188 (see FIG. 2) to precipitate the molybdenum.

The invention is further illustrated by the following examples.

EXAMPLE A

Approximately 20 ml of aqueous solution was added to a centrifuge tube and purged with argon. A small amount of reducing metal was then added with a spatula and the solution again purged with argon. Ten (10) ml of 1 g/l cobalt-loaded organic (LIX) was then added and the tube tightly capped. The centrifuge tube was then immersed into a constant temperature bath maintained at the desired temperature (usually 40° C or 60° C). After about 10 minutes in the bath, the centrifuge tubes were intermittently shaken to facilitate contact of the three phases. Relevant observations were noted and in some cases the solutions were analyzed. Effective reduction of the cobaltic LIX compound was quickly apparent by the change from a dark color to a light or even yellow color.

In some of the shakeouts, stripping of the cobalt which had been reduced was attempted. In these cases, the caps were carefully removed and the argon purge resumed in order to keep the organic cobaltous from coming in contact with air. A 5 ml sample of the organic was drawn off with a syringe and transferred to another argon purged centrifuge tube containing ≈20 ml of 200 g/l $H_2SO_4$. The tube was immediately capped and shaken for ~1 minute.

A description of the results for each experiment is given in Table A-1.

TABLE A-1
Results of Preliminary Shakeouts

| No. | Reducing and/or Stripping Media | Temp, °C | Reduce-? | Observations |
|---|---|---|---|---|
| 1 | Co° powder, 150 g/l $NH_3$, 99 g/l $CO_2$ solution | 40 | Yes | Approximately 30 minutes of intermittent shaking. Resulting aqueous solution red. Co appears to react and build up in $NH_3$ solution. Resultant organic light yellow, but analysis indicated the organic contained 8.12 g Co/l. The aqueous contained 1.46 g Co/l. 99.2% of the cobalt in the organic stripped off with 20 v/v% $H_2SO_4$. Stripped organic contained 0.067 g Co/l. |
| 2 | Co° powder, 150 g/l $NH_3$, 88 g/l $CO_2$ solution | 60 | Yes | Reduction of organic cobalt much faster. Cobalt reacts with $NH_3$ solution faster. |
| 3 | Co° powder, 50 g/l $NH_3$, 12 g/l $CO_2$ solution | 40 | Yes | Reduction reaction much slower than with higher $NH_3$ concentration (#1). ≈ >90% reduction within 30 minutes of intermittent shaking. Result aqueous solution clear, however, indicating slower build-up of cobalt in aqueous. Final organic analysis: 3.13 g/l $Co^{(+2)}$ Final aqueous analysis: 0.052 g/l Co |
| 4 | Co° powder, 50 g/l $NH_3$, 12 g/l $CO_2$ solution | 40 | Yes | Reduction fast (10 minutes). Cobalt reacts more rapidly with $NH_3$ solution than in #3. |
| 5 | Zn° granular, 150 g/l $NH_3$, 88 g/l $CO_2$ solution | 40 | Yes | Fast reduction (15 minutes) for near quantitative reduction. Organic yellow. Zn° reacts with $NH_3$ solution. Reduced organic contained 0.94 g Co/l, and 2.90 g Zn/l. Aqueous solution contained 0.019 g Co/l, and 7.15 g Zn/l. $H_2SO_4$ stripped reduced organic contained 0.018 g Co/l and 0.001 g Zn/l. |
| 6 | Zn° granular, 150 g/l $NH_3$, 88 g/l $CO_2$ solution | 60 | Yes | Reduction very fast. Organic turned completely yellow. Zn° reacts very rapidly with $NH_3$ solution. |
| 7 | Zn° granular, 50 g/l $NH_3$, 12 g/l $CO_2$ solution | 60 | Yes | Fast reduction, though slower than no. 6. Zn° reacts slower with $NH_3$ solution. |
| 8 | Zn° granular, (no 3rd phase) | 40 | No | No visible change in color of organic. |
| 9 | Co° powder, pH 1.93 (adjusted with $H_2SO_4$) | 40 | Yes | Only ≈½ of cobalt originally on organic was reduced. Organic still dark. At first aqueous turned red, then clear. Apparently, Co° reacted with acid causing pH to rise to 6.4 where $Co^{+2}$ extracts. Co° continued to dissolve and extract. Final organic concentration: 6.1 g Co/l. Final aqueous concentration: 0.248 g Co/l. All extracted cobalt stripped off with $H_2SO_4$ except 0.448 g/l. |
| 10 | Cu° powder, 150 g/l $NH_3$, 88 g/l $CO_2$ solution | 40 | Somewhat | Organic took on a greenish, more transparent color. Cu° powder had an oxide layer which dissolved. |
| 11 | Cu° powder, 150 g/l $NH_3$, 88 g/l $CO_2$ solution. | 40 | No | No apparent reaction. Cu° powder was first cleaned of oxide layer before using. This was the only difference from no. 10. |
| 12 | Ni° powder, 150 g/l $NH_3$, 88 g/l $CO_2$ solution1 | 40 | Unknown | Organic turned dark violet-red. No analyses performed. |
| 13 | Sulfurous acid (≈4% $SO_2$) | 60 | No | No visible color change in organic or aqueous. |
| 14 | Hypophosphorous acid (≈10% $H_3PO_2$) | 660 | No | No visible color change in organic or aqueous. |
| 15 | Sulfurous acid, Cu° powder (4% $SO_2$) | 60 | Yes | Stripping ~ slow. After about 20 min., most of cobalt stripped, but organic still dark because Cu° oxidized to $Cu^{++}$ extracted pH: 1.4. |
| 16 | Hypophosphorous acid (≈10% $H_3PO_2$) Cu° powder | 60 | Yes | Very fast stripping — within 10 minutes of intermittent shaking, only 6 ppm Co remained on organic. Aqueous analysis indicated only 2 ppm Cu. A layer of Cu° powder at bottom of sample bottle indicated that $Cu^{++}$ generated by Co reduction reaction was reduced back to Cu° by the $H_3PO_2$ solution upon settling. $Co^{+2}$ remained in solution. |
| 17 | 20 v/v% $H_2SO_4$, Cu° powder | 60 | Yes | <10 minutes — cobalt stripping nearly quantitative. 11 ppm Co remained on organic. Aqueous analyzed 0.398 g Co/l, 1.82 g Cu/l. (O/A <1) |
| 18 | 20 v/v% $H_2SO_4$, Cu° powder | ~25 | Somewhat | Extremely slow reaction, if at all. |
| 19 | 20 v/v% $H_2SO_4$, Cu° powder | 40 | yes | ≈10–15 minutes of intermittent shaking for complete stripping of cobalt. |
| 20 | pH 1.0, Cu° powder | 40 | Yes | Reaction slow, but eventually complete stripping of reduced Co and complete extraction of oxidized Cu. >30 minutes intermittent shaking. |
| 21 | pH 1.0, Cu° powder | 60 | Yes | Reaction faster (~15-20 min.). Aqueous turned pink and all generated $Cu^{+2}$ extracted. |
| 22 | 50 v/v% $H_2SO_4$, Cu° powder | 60 | Yes | Very poor phase separation. Partial destruction of organic. All Co stripped, however kinetics not necessarily faster |

TABLE A-1-continued

Results of Preliminary Shakeouts

| No. | Reducing and/or Stripping Media | Temp, °C | Reduce-? | Observations |
|---|---|---|---|---|
| 23 | 20 v/v% $H_2SO_4$, Fe° powder | 60 | Yes | than lower $H_2SO_4$ conc. Nearly complete Co stripped. Fe° reacted rather quickly with acid. Stripped organic contained ~4 ppm Co. Aqueous solution contained 0.382 g Co/l and 30 g/l Fe. Reduction fast. |
| 24 | 20 v/v% $H_2SO_4$, $Sn^{+2}$ (added as $SnCl_2 \cdot 2H_2O$) | 60 | (Yes) | At first, the reaction did not appear to work. Sitting over weekend, however, caused nearly quantitative stripping of cobalt. |
| 25 | 20 v/v% $H_2SO_4$, $Mn^{+2}$ (added as $MnCl_2 \cdot 4H_2O$) | 60 | Yes | Aqueous turned pink. Organic mostly stripped of cobalt within 15 minutes. |
| 26 | 20 v/v% $H_2SO_4$, $Mn^{+2}$ (added as $MnSO_4 \cdot H_2O$) | 60 | No | Either no reaction at all, or reaction very slow. |
| 271 | 20 v/v% $H_2SO_4$, $Fe^{+2}$ (added as $FeSO_4 \cdot 7H_2O$) | 60 | No | No visible change in color of organic. |
| 28 | 20 v/v% $H_2SO_4$, $Fe^{+2}$, $Cl^-$ (added as NaCl, and $FeSO_4 \cdot 7H_2O$) | 60 | Yes | Fast stripping of cobalt. Nearly quantitative after 10 minutes. Faster than no. 29 which contained no $Fe^{+2}$. |
| 29 | 20 v/v% $H_2SO_4$, $Cl^-$ (added as NaCl) | 60 | yes | Aqueous turned pink, organic transparent after ≈15 minutes. The same shakeout performed in air took only slightly longer to achieve the same results. |
| 30 | 20 v/v% $H_2SO_4$, $NH_2OH \cdot HCl$ (hydroxylamine hydrochloride) | 60 | Yes | Organic turned yellow within ~15 minutes. Aqueous turned pink. |

As is shown in Table A-1, the rate of reduction was visibly faster at 60° C than at 40° C. An aqueous phase was needed in all cases. Zinc powder was not effective alone even though LIX-64N is capable of loading the zinc cation. In ammoniacal solution-metal powder slurries, reduction with 150 g/l $NH_3$, zinc was more effective than cobalt.

Several acid systems could simultaneously reduce and strip cobalt, some using a metal powder and some using an aqueous phase reducing agent. Manganese chloride in 20% sulfuric acid achieved reduction but a similar solution using the manganese sulfate did not; this indicated that chloride was playing a role; but a comparison of an acid chloride solution with and without ferrous ion indicated the ferrous ion was also effective.

EXAMPLE B

The following experiment was designed to determine the extent to which Cu strip solution will strip cobalt from an organic containing ≈1 g/l Co — all of which is oxidized to the $Co^{+3}$ state.

250 ml each of 1 g/l cobalt-loaded organic and pilot plant synthetic Cu strip feed solution were added to a double-walled beaker. A high speed stirrer was started upon reaching 40° C (hot water circulation) for vigorous mixing of the phases. Samples were periodically withdrawn by shutting off the stirrer and syringing out 10 ml each of organic and aqueous for cobalt analysis. Aqueous samples were centrifuged at ≈1300 XG for 10 minutes to remove organic entrainment prior to submitting for analysis. The results are shown in Table I.

TABLE I

Cobalt Reduction/Stripping from LIX 64N Containing 1 g/l Cobalt

| Reducing Agent (in 1 liter) | Solution Composition (g/l) | Temp (°C) | % Co Stripped from Organic (1 g/l Co) | | |
|---|---|---|---|---|---|
| 10 gr Zn metal | 150 $NH_3$ | 40 | 14% | at | 6 min |
|  | 88 $CO_2$ |  | 90% | at | 50 min |
| 50 gr Zn metal | 150 $NH_3$ | 40 | 41% | at | 6 min |
|  | 88 $CO_2$ |  | 99.8% | at | 35 min |
| 50 gr Zn metal | 50 $NH_3$ | 40 | 22% | at | 6 min |
|  | 22 $CO_2$ |  | 90% | at | 60 min. |
| 10 gr Zn metal | 150 $NH_3$ | 60 | 22% | at | 6 min |
|  | 88 $CO_2$ |  | 91% | at | 70 min |

TABLE I-continued

Cobalt Reduction/Stripping from LIX 64N Containing 1 g/l Cobalt

| Reducing Agent (in 1 liter) | Solution Composition (g/l) | Temp (°C) | % Co Stripped from Organic (1 g/l Co) | | |
|---|---|---|---|---|---|
| 10 gr Cu metal | 150 $NH_3$ | 40 | 8% | at | 6 min |
|  | 88 $CO_2$ |  | 17% | at | 136 min |
| 10 gr Cu metal | 150 $NH_3$ | 40 | >99% | at | 1 min |
| 10 g/l $Cu^+$ ion | $CO_2$ |  |  |  |  |
| 10 g/l $Cu^+$ ion | 150 $NH_3$ | 40 | >99% | at | 1 min |
|  | 88 $CO_2$ |  |  |  |  |
| 10 gr Cu metal | 165 $H_2SO_4$ | 40 | 10% | at | 6 min |
|  | 35 $Cu^{++}$ |  | 83% | at | 120 min |
| None | 165 $H_2SO_4$ | 40 | 4% | at | 1 min |
|  | 35 $Cu^{++}$ |  | 4% | at | 30 min |
|  |  |  | 9% | at | 360 min |

Cobalt extraction did occur in the pilot plant operation of the cuprion process despite the oxidation of the pregnant liquor (cobalt oxidation may not have been complete). If some cobaltic extraction can occur, then cobalt extraction cannot be prevented. The following experiments were performed in order to measure the extent to which cobalt (ic) can be extracted with LIX directly from ammoniacal solution. Three aqueous solutions were prepared containing 50 g/l $NH_3$, 22 g/l $CO_2$, 0.5 g/l Co as: (1) cobaltic hexammine, (2) cobaltic chloropentammine, and (3) cobaltic aquapentammine.

EXAMPLE C 100 ml of each $Co^{+3}$ solution was introduced into 250 ml double-walled separatory funnels, respectively, along with 100 ml fresh 40 v/v% LIX 64N. Upon reaching 40° C (hot water circulation), mechanical shaking was initiated for phase mixing. At times 5, 15, 30, 90, 210 minutes the shaker was shut off and the phases allowed to separate for sampling. Ten (10) ml of each phase was drawn off for subsequent Co analysis (organic samples first centrifuged at ≈1300 XG for 10 minutes). pH of aqueous samples was measured at 40° C. Visible spectra of aqueous solutions was taken before and at the end of each experiment.

Figure 3:
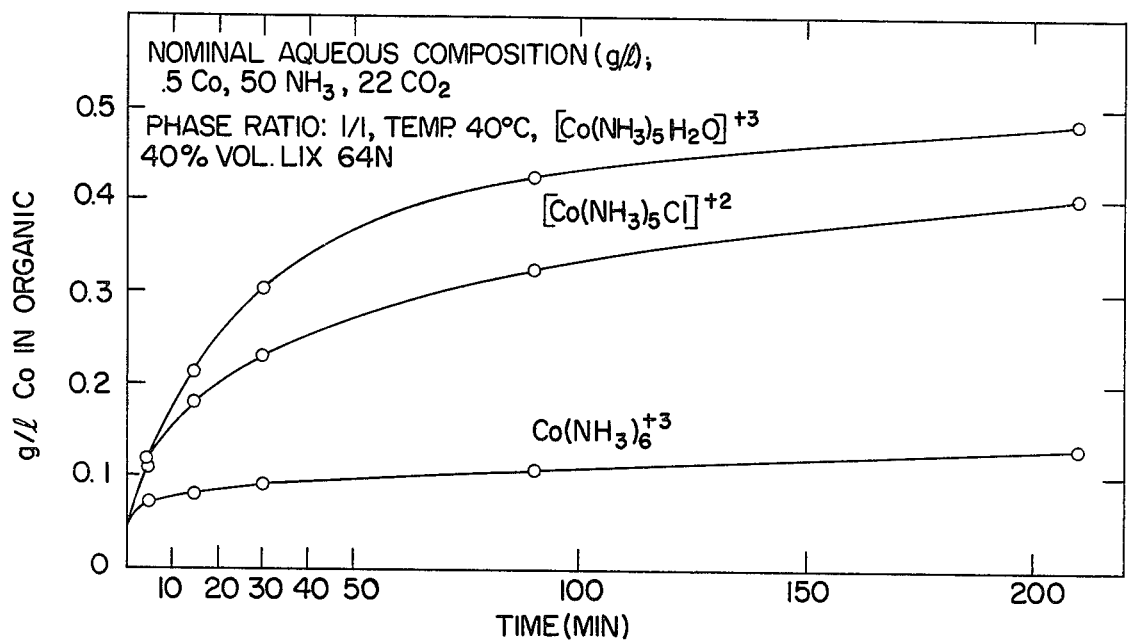
FIG. 3 is a graph showing cobalt extraction kinetics from ammoniacal cobaltic ammine solutions.

The data is summarized in FIG. 3. Cobalt from the pentammine solutions extracted more rapidly than from the hexammine. LIX loaded with cobalt from the pentammine solutions retained an olive-green color while LIX loaded with cobalt from the hexammine solution was the usual brown color. Neither the green nor brown species was strippable with 20 v/v% $H_2SO_4$. Cobalt extraction did occur with all three complexes indicating that it is impossible to stop cobalt extraction.

EXAMPLE D

Cobalt Reduction/Stripping in LIX 64N

A series of experiments was carried out in apparatus designed to quantify the performance of various reducing agents which were successful in the preliminary shakeout phase for reducing $Co^{+3}$ in the organic to the $Co^{+2}$ state. Most of the experiments involved 3-phase systems in which a reducing metal was present along with an aqueous ammoniacal or acidic solution. A few experiments only involved a 2-phase system (no metal present). The following experimental description is general for all experiments with specific procedures following for the two basic types of reducing media: (1) ammoniacal and (2) acidic.

All experiments were carried out in a 500-ml glass, double-walled resin reaction flask equipped with an airtight glass cover. The cover had four standard taper glass joints for (1) teflon stirrer chuck, (2) thermometer, (3) gas inlet and outlet, and (4) sample port. Temperature of the reaction was controlled by hot water circulation (most experiments were carried out at 40° C or 60° C). Every reaction was performed at O/A = 1 (250 ml each of a cobalt-loaded organic and an aqueous phase). After the solutions and headspace within the reactor had been purged with argon to remove all oxygen from the system, and after the solutions had reached the desired temperature, the reaction was started at $t = 0$ by turning on the stirrer. The stirring apparatus consisted of a 3 inch bow tie-type teflon stirrer blade powered by a Fischer dyna mix motor. A constant speed of approximately 700 RPM was used for all experiments. Samples of organic and aqueous were drawn off with 10-ml syringes at timed intervals to later determine extent of reduction. A color change of the organic from dark brown to yellow was used as an indicator on when the reaction was near completion.

At the end of every run, a sample of the cobalt-stripped organic was loaded with Cu at 40° C, O/A = 0.05 (10 ml organic/200 ml aqueous) from a solution containing 3.8 g/l Cu, 50 g/l $NH_3$, and 22 g/l $CO_2$. Both organic and aqueous samples were submitted for Co, Cu, $NH_3$ analyses. The purpose of this shakeout was to measure any loss in LIX-loading capacity which might be caused by particular reduction conditions.

(1) Ammoniacal reducing systems: The following sampling procedure was devised in order to determine extent of reduction. It is assumed that only the $Co^{+2}$ species will strip from the organic with 20 v/v% $H_2SO_4$.

At timed intervals, the stirrer was shut down to allow the phases to separate and any metallic pieces to fall to the bottom. An aqueous sample was first removed from the reactor with a 10-ml syringe and submitted directly for relevant analyses. A few mls were used to measure pH at the appropriate temperature. An anaerobic sample of the organic was then withdrawn with a 10-ml gas-tight syringe and injected into an argon-purged 60-ml separatory funnel containing 25 ml 20 v/v% $H_2SO_4$. The separatory funnel was immediately shaken to strip any $Co^{+2}$ which was generated during the reduction reaction. Both the stripped organic and acid strip solutions were submitted for relevant analyses.

At the end of each run, a final reduced organic sample was removed from the reactor and allowed to air oxidize for analysis. In two cases, reduced organic was contacted with ammoniacal Cu solution (in the absence of air) by the same procedure as the Cu-loading experiment in an attempt to "crowd" $Co^{+2}$ from the organic.

A few experiments were performed using $Cu^+$ as the reductant. In every case, the $Cu^+$ ammoniacal solution was prepared by adding $Cu^{+2}$ first (as the basic carbonate), then reducing it under an argon atmosphere with excess Cu metal. In the reaction where no Cu metal was present, a long, coiled Cu wire was inserted into the reactor and subsequently removed when the blue cupric solution had turned clear.

(2) Acidic reducing systems: The sampling procedure for acid systems was considerably less complicated than for ammoniacal systems because $Co^{+2}$ is stripped as soon as it is generated by the reduction process, thus requiring no external anaerobic stripping procedure. Organic and aqueous samples were simply withdrawn simultaneously (without shutting off the stirrer) with a 30-ml syringe, allowed to separate in small separatory funnels, and then submitted directly for analysis. The sampling times given in the tables for the ammoniacal reactions have been corrected not to include periods of stirrer shutdown.

In every reaction involving zinc metal and ammonia, the cobalt stripped organic samples retained a strange "oily" odor. The odor became more pungent as the reaction proceeded and more cobalt was reduced. Zn metal reacted with the $NH_3$ solution in every experiment. Bubbles of hydrogen gas evolved from the surface of the zinc becoming more violent as $NH_3$ concentration and/or temperature increased.

During reactions involving $Cu^+$ ion, it was discovered that a small amount of $Cu^+$ loaded onto the LIX but would not strip off again with 20 v/v% $H_2SO_4$. However, the $Cu^+$ loaded organic proved to be air sensitive and within a few minutes of exposure to air, the yellow $Cu^+$ loaded LIX would oxidize to the brown $Cu^{+2}$ loaded LIX which easily stripped with 20 v/v% $H_2SO_4$. Although no odor was observed in any cobalt stripped organic, the characteristic odor perceived in the zinc experiments was noticed on two organic samples which had been air oxidized to convert $Cu^+$ to $Cu^{++}$ prior to stripping with $H_2SO_4$ (see Tables F-6 and F-13).

After each $Cu^+$ experiment which involved $\approx 10$ g/l $Cu^+$, a layer of Cu metal precipitated out at the interface between the organic and aqueous phases upon sitting overnight. After the last experiment (Table F-13), the solutions sat for at least a week. The $Cu^°$ precipitated at the interface was removed as a single sheet of $Cu^°$ foil which had a remarkable strength considering its origin.

The Cu loading experiments performed after each experiment on cobalt-stripping organic were designed to produce data from which possible organic destruction would be deduced. Three different Co-loaded organics were used in the experiments, each differing in their Cu loading capacities slightly:

(1) 1.02 g/l Co-loaded organic — used in Tables F-1 through F-5. "Blank" on Table F-1 indicated a total loading capacity of 11.9 g/l Cu when contacted with the standard Cu/NH$_3$ solution (used in every loading experiment). This organic "Blank" contained no cobalt but represented the 40 v/v% LIX from which the 1.02 g/l Co-loaded organic was prepared.

(2) 1.00 g/l Co-loaded organic — used in Tables F-6 thru F-7. No blank performed, but total loading capacity is probably between 12.1–12.5 g/l Cu.

(3) Pilot plant recycle LIX 64N, used in Tables F-10 thru F-13, contains 0.0875 g/l Co and according to the Blank (Table F-14), the total loading capacity is 10.9 g/l Cu (when corrected for cobalt concentrate).

The general formula used when correcting for cobalt concentration to determine total Cu-loading capacity is:

$$\left[\frac{g\ Co/l}{58.93} \times 1.5\right] 63.54 + [g\ Cu/l] = [T.L.\ Capacity]$$

The above formula assumes all cobalt is complexed with 3 LIX molecules

Values for determining loading capacity loss are given in Table F-14. In many cases increased loading capacity for Cu was observed which could be due to analytical error or indicate an error in the above assumption.

It should be mentioned, however, that in Table F-12, the total loading capacity for the LIX after cobalt stripping was 11.7 g/l — approximately 1.3% less than the Blank. After the cobalt crowding, the total loading capacity was 12.5 g/l Cu or 3.3% greater than the blank. Since this was a zinc experiment, it is interesting to note that the odor perceived on the organic samples always followed the cobalt stripping step. Milder cobalt stripping conditions, such as 20 g/l H$_2$SO$_4$, may eliminate LIX breakdown since the evidence points to the anaerobic, acid stripping step as the step which produces an organic sample with a strange odor.

Results: The results are summarized in Table I above for synthetic cobalt (1 g/l) LIX solutions and in Table II below for pilot plant LIX. Complete details are provided in the tables F. When zinc metal was used as the reducing agent, the reduction was enhanced by increasing the temperature, increased amount of zinc metal, and increased concentration of ammonia in the aqueous phase. Very little cobalt was stripped into the ammoniacal reduction liquor, but cobalt was effectively stripped with acid solutions. Most of the zinc cation formed during the reduction remained in the ammoniacal solution. Far more zinc was oxidized than is consistent with cobaltic oxidation of the zinc.

The use of copper metal in ammoniacal solution as the reductant was unsuccessful if the surface of the copper powder was de-oxidized. Consideration of these results lead to the examination of cuprous ion solutions as a reductant. The result was a very fast reduction of the cobalt compound so that cuprous ion reduction was further studied with pilot plant organic.

The cuprous ion reduction was tested with pilot plant organic to be sure the laboratory work was applicable to the real solution. It can be seen that the higher the concentrations of cuprous ion, the faster the reduction and effective the stripping. The lowest cuprous ion concentration, 0.178 g/l, was ineffective. A cuprous ion solution such as is available in the reduction plant, $\sim$5 g/l Cu$^+$, should be an effective reducing medium.

In experiments described in Tables F-2 and F-6, an attempt to "crowd" reduced cobalt from the organic with Cu was made. Under the conditions given, 63% of the cobalt was crowded off when contacted for 2 min. with 3.79 g/l Cu, 50 g/l NH$_3$, and 77% of the cobalt was crowded off when contacted with 3.79 g/l Cu, 100 g/l NH$_3$. If such a crowding could be obtained, then a small portion of the Cuprion reduction liquor could be used to strip the cobalt. This stream could be oxidized and thrown back into the pregnant liquor.

Simultaneous reduction and stripping was achieved using Cu° in the presence of synthetic copper strip solution. In each case, 10 grams (86.4 sq in) of Cu° were added to the reaction flask as turnings.

TABLE II

Cobalt Reduction/Stripping from Pilot Plant Recycle LIX 64N

Organic Feed: Pilot plant barren organic .0875 g/l Co, .490 g/l Cu

| Reducing Agent (in 1 liter) | Solution Composition (g/l) | % Co Stripped from Organic (1 g/l Co) | |
|---|---|---|---|
| 9.24 g/l Cu$^+$ | 49.6 NH$_3$ | 80% at | 1 min |
| 1.05 g/l Cu$^+$ | 22.0 CO$_2$ | 97% at | 6 min |
|  | 49.6 NH$_3$ | 67% at | 1 min |
| 0.178 g/l Cu | 22.0 CO$_2$ | 78% at | 5 min |
|  | 49.6 NH$_3$ | 6% at | 1 min |
|  | 22.0 CO$_2$ | 7% at | 6 min |
| 10 gr Cu Metal | 165 H$_2$SO$_4$ | 7% at | 19 min |
|  |  | 13% at | 1 min |
|  | 35 Cu$^{++}$ | 33% at | 30 min |
|  |  | 46% at | 130 min |

TABLE F-1

Cobalt Reduction in LIX 64N with Zinc Metal in Ammonia Solution With 10 Grams Zinc Organic Feed: 1.02 g/l Co loaded 40 v/v% LIX 64N in kerosene
Aqueous Feed: 142 g/l NH$_3$, $\approx$88 g/l CO$_2$, pH at 40° C: 9.90
Reductant: 10 grams Zn°, granular ($\approx$20 mesh)
O/A: 1.0
Temperature: 40° C, Argon atmosphere
Strip Aqueous Feed: 20 v/v% H$_2$SO$_4$
Strip O/A: 1:2.5

| Sample No. | Time (min) | Aqueous Co g/l | Zn g/l | NH$_3$ g/l | pH (40° C) | Reduced Organic Co g/l | Zn g/l | NH$_3$ g/l | Stripped Organic Co g/l | Acid Strip Co g/l | Zn g/l | NH$_3$ g/l |
|---|---|---|---|---|---|---|---|---|---|---|---|---|
| 1 | 6 | 0.0031 | 1.36 | — | 9.82 | — | — | — | 0.856 | 0.0234 | 0.019 | 1.425 |
| 2 | 20 | 0.0027 | 4.63 | 130.1 | 9.78 | — | — | — | 0.540 | 0.127 | 0.0652 | 1.448 |
| 3 | 35 | 0.0086 | 7.70 | — | 9.75 | — | — | — | 0.253 | 0.236 | 0.043 | 1.362 |
| 4 | 50 | 0.0095 | 9.63 | 121.8 | 9.74 | 1.00 | 0.242 | 2.44 | 0.090 | 0.308 | 0.0678 | 1.434 |

Loading of Stripped Organic with Cu

Aqueous Feed: 3.79 g Cu/l, 50.54 g NH$_3$/l, $\sim$22 g CO$_2$/l, pH: 9.83$^5$ at 40° C
Organic Feed: A - Fresh 40 v/v% LIX 64N in kerosene (Blank)

TABLE F-1-continued

B - Stripped organic from above reaction
O/A: 1:20
Temperature: 40° C
Contact Time: 10 minutes

| Sample | Organic | | | Aqueous | | |
|---|---|---|---|---|---|---|
| | Co g/l | Cu g/l | $NH_3$ g/l | Cu g/l | $NH_3$ g/l | pH (40° C) |
| A | — | 11.9 | 0.34 | 3.13 | 50.24 | 9.82[7] |
| B | 0.085 | 11.3 | 0.28 | 3.21 | 50.24 | 9.82[2] |

TABLE F-2

Cobalt Reduction in LIX 64N with Zinc Metal in Ammonia Solution with 50 Grams Zinc Organic Feed: 1.02 g/l Co loaded 40 v/v% LIX 64N in kerosene
Aqueous Feed: 142 g/l $NH_3$, ~88 g/l $CO_2$, pH: 9.90 at 40° C
Reductant: 50 grams $Zn°$, granular ($\approx$20 mesh)
O/A: 1.0
Temperature: 40° C, Argon atmosphere
Strip Aqueous Feed: 20 v/v% $H_2SO_4$
Strip O/A: 1:2.5

| Sample No. | Time (min) | Aqueous | | | | Reduced Organic | | | Stripped Organic | Acid Strip | | |
|---|---|---|---|---|---|---|---|---|---|---|---|---|
| | | Co g/l | Zn g/l | $NH_3$ g/l | pH (40° C) | Co g/l | Zn g/l | $NH_3$ g/l | Co g/l | Co g/l | Zn g/l | $NH_3$ g/l |
| 1 | 6 | 0.0018 | 2.61 | 12.96 | 9.76 | — | — | — | 0.584 | 0.0955 | 0.042 | 1.38 |
| 2 | 14 | 0.0021 | 8.08 | — | 9.78 | — | — | — | 0.0232 | 0.336 | 0.068 | 1.53 |
| 3 | 24 | 0.0013 | 13.1 | — | 9.76 | 0.988 | 0.245 | 2.60 | 0.0023 | 0.347 | 0.102 | 1.41 |

Loading of Organic with Cu

Organic Feed: Stripped organic from above reaction
Aqueous Feed: 3.79 g/l Cu, 50.54 g/l $NH_3$, ~22 g/l $CO_2$, pH: 9.83 at 40° C
O/A: 1:20
Temperature: 40° C
Contact Time: 10 minutes

| Organic | | | Aqueous | | |
|---|---|---|---|---|---|
| Co g/l | Cu g/l | $NH_3$ g/l | Cu g/l | $NH_3$ g/l | pH (40° C) |
| 0.0252 | 11.7 | 0.25 | 3.21 | 50.00 | 9.83 |

Crowding Cobalt from Organic with Cu

Organic Feed: ~0.988 g/l $Co^{+2}$, 0.245 g/l Zn, 2.60 g/l $NH_3$
Aqueous Feed: 3.79 g/l Cu, 50.5 g/l $NH_3$, ~22 g/l $CO_2$, pH: 9.83 at 40° C
O/A: 1:20
Temperature: Ambient, Argon atmosphere
Contact Time: 2 minutes

| Organic | | | | Aqueous | | | | |
|---|---|---|---|---|---|---|---|---|
| Co g/l | Zn g/l | $NH_3$ g/l | Cu g/l | Co g/l | Zn g/l | $NH_3$ g/l | Cu g/l | pH (40° C) |
| 0.368 | 0.015 | 0.22 | 11.7 | 0.0285 | 0.012 | 50.4 | 3.16 | 9.82 |

TABLE F-3

Cobalt Reduction in LIX 64N with Zinc Metal in Ammonia Solution at 60° C

Organic Feed: 1.02 g/l Co loaded 40 v/v% LIX 64N in kerosene
Aqueous Feed: 142 g/l $NH_3$, ~88 g/l $CO_2$, pH: 9.90 at 40° C
Reductant: 10 grams $Zn°$, granular ($\approx$20 mesh)
O/A: 1.0
Temperature: 60° C, Argon atmosphere
Strip Aqueous Feed: 20 v/v% $H_2SO_4$
Strip O/A: 1:2.5

| Sample No. | Time (min) | Aqueous | | | | Reduced Organic | | | Stripped Organic | Acid Strip | | |
|---|---|---|---|---|---|---|---|---|---|---|---|---|
| | | Co g/l | Zn g/l | $NH_3$ g/l | pH (60° C) | Co g/l | Zn g/l | $NH_3$ g/l | Co g/l | Co g/l | Zn g/l | $NH_3$ g/l |
| 1 | 6 | 0.006 | 3.25 | 124.5 | 9.15 | — | — | — | 0.780 | 0.050 | 0.038 | — |
| 2 | 14 | 0.0118 | 12.4 | — | 9.12 | — | — | — | 0.530 | 0.150 | 0.080 | — |
| 3 | 24 | 0.0132 | 19.4 | — | 9.11 | — | — | — | 0.319 | 0.218 | 0.094 | — |
| 4 | 52 | 0.0095 | 27.4 | 103.5 | 9.06 | 0.982 | 0.375 | 1.83* | 0.0875 | 0.282 | 0.130 | — |

Loading of Organic with Cu

Organic Feed: Stripped organic from above reaction
Aqueous Feed: 3.79 g/l Cu, 50.5 g/l $NH_3$, ~22 g/l $CO_2$, pH: 9.83 at 40° C
O/A: 1:20
Temperature: 40° C
Contact Time: 10 minutes

| Organic | | | Aqueous | | |
|---|---|---|---|---|---|
| Co g/l | Cu g/l | $NH_3$ g/l | Cu g/l | $NH_3$ g/l | pH (40° C |

TABLE F-3-continued

| 0.124 | 11.7 | 0.334 | 3.16 | 50.11 | 9.83 |

TABLE F-4

Cobalt Reduction in LIX 64N with Zinc Metal in Ammonia Solution (50 g/l)

Organic Feed: 1.02 g/l Co loaded 40 v/v% LIX 64N in kerosene
Aqueous Feed: 49.6 g/l $NH_3$, 22.0 g/l $CO_2$, pH: 9.82 at 40° C
Reductant: 50 grams Zn°, granular (20 mesh)
O/A: 1.0
Temperature: 40° C, Argon atmosphere
Strip Aqueous Feed: 20 v/v% $H_2SO_4$
Strip O/A: 1:25

| Sample No. | Time (min) | Aqueous Co g/l | Zn g/l | $NH_3$ g/l | pH (40° C) | Reduced Organic Co g/l | Zn g/l | $NH_3$ g/l | Stripped Organic Co g/l | Acid Strip Co g/l | Zn g/l | $NH_3$ g/l |
|---|---|---|---|---|---|---|---|---|---|---|---|---|
| 1 | 6 | 0.0115 | 0.940 | 44.79 | 9.76 | — | — | — | 0.794 | 0.043 | 0.0193 | — |
| 2 | 14 | 0.0170 | 1.50 | — | 9.77 | — | — | — | 0.464 | 0.163 | 0.164 | — |
| 3 | 23 | 0.0180 | 2.04 | — | 9.77 | — | — | — | 0.246 | 0.246 | 0.202 | — |
| 4 | 43 | 0.0115 | 2.750 | 42.58 | 9.76 | 1.02 | 0.655 | 1.75 | 0.0385 | 0.314 | 0.229 | — |

Loading of Organic with Cu

Organic Feed: Stripped organic from above reaction
Aqueous Feed: 3.79 g/l Cu, 50.5 g/l $NH_3$, ~22 g/l $CO_2$, pH: 9183 at 40° C
O/A: 1:20
Temperature: 40° C
Contact Time: 10 minutes

| Organic | | | Aqueous | | |
|---|---|---|---|---|---|
| Co g/l | Cu g/l | $NH_3$ g/l | Cu g/l | $NH_3$ g/l | pH (40° C) |
| 0.0684 | 11.7 | 0.343 | 3.18 | 50.24 | 9.89 |

TABLE F-5

Cobalt Reduction in LIX 64N with Copper Metal in Ammonia Solution

Organic Feed: 1.02 g/l Co loaded 40 v/v% LIX 64N in kerosene
Aqueous Feed: 142 g/l $NH_3$, ≈88 g/l $CO_2$, pH: 9.90 at 40° C/
Reductant: 10 grams Cu°, short turnings
O/A: 1.0
Temperature: 40° C, Argon Atmosphere
Strip Aqueous Feed: 20 v/v% $H_2SO_4$
Strip O/A: 1:25

| Sample No. | Time (min) | Aqueous Co g/l | Cu g/l | $NH_3$ g/l | pH (40° C) | Reduced Organic Co g/l | Cu g/l | $NH_3$ g/l | Stripped Organic Co g/l | Cu g/l | Acid Strip co g/l | Cu g/l | $NH_3$ g/l |
|---|---|---|---|---|---|---|---|---|---|---|---|---|---|
| 1 | 7 | 0.0004 | 0.0038 | 130 | 9.79 | — | — | — | 0.960 | <0.0004 | 0.0111 | 0.0098 | 2.50 |
| 2 | 30 | 0.001 | 0.0037 | — | 9.75 | — | — | — | 0.890 | <0.0004 | 0.0375 | 0.0259 | 1.61 |
| 3* | 65 | 0.0038 | 0.0076 | 122 | 9.72 | — | — | — | 0.775 | <0.0004 | 0.0755 | 0.0525 | 1.66 |
| 4 | 80 | 0.0040 | 0.520 | — | 9.70 | — | — | — | 0.840 | 0.0038 | 0.0666 | 0.924 | 1.19 |
| 5 | 90 | 0.0033 | 0.612 | 118 | 9.68 | 1.05 | 2.31 | 1.55 | 0.865 | 0.0047 | 0.0618 | 0.934 | 1.17 |

Loading of Organic With Cu

Organic Feed: Final stripped organic from above reaction
Aqueous Feed: 3.79 g/l Cu, 50.5 g/l $NH_3$, ≈22 g/l $CO_2$, pH: 9.83 at 40° C
O/A: 1:20
Temperature: 40° C
Contact Time: 10 minutes

| Organic | | | Aqueous | | |
|---|---|---|---|---|---|
| Co g/l | Cu g/l | $NH_3$ g/l | Cu g/l | $NH_3$ g/l | pH (40° C) |
| 0.885 | 10.9 | 0.353 | 3.26 | 49.9 | 9.84 |

*1 gram basic Cu carbonate added to reactor.

TABLE F-6

Cobalt Reduction in LIX 64N with Copper/Cuprous in Ammonia Solution

Organic Feed: 1.00 g/l Co loaded 40 v/v% LIX 64N in kerosene
Aqueous Feed: 49.6 g/l $NH_3$, 22.0 g/l $CO_2$, pH: 9.83 at 40° C
Reductant: 10 g/l $Cu^+$, ≈10 g Cu°, short turnings
O/A: 1.0
Temperature: 40° C, Argon atmosphere
Strip Aqueous Feed: 20 v/v% $H_2SO_4$
Strip O/A: 1:2.5

| Sample No. | Time (min) | Aqueous Co g/l | Cu g/l | $NH_3$ g/l | pH (40° C) | Reduced Organic Co g/l | Cu g/l | $NH_3$ g/l | Stripped Organic Co g/l | cu g/l | Acid Strip Co g/l | Cu g/l | $NH_3$ g/l |
|---|---|---|---|---|---|---|---|---|---|---|---|---|---|
| 1 | 6 | 0.0005 | 7.36 | 43.2 | 9.62 | — | — | — | 0.0036 | 0.400 | 0.329 | 0.547 | 0.766 |

TABLE F-6-continued

| | | | | | | | | | | | | | |
|---|---|---|---|---|---|---|---|---|---|---|---|---|---|
| 2 | 11 | 0.0005 | 7.17 | 43.2 | 9.63 | 1.05 | 2.49 | 0.957 | 0.0024 | 0.420 | 0.330 | 0.583 | — |
| | | | | | | | | | *0.0021 | 0.0099 | 0.375 | 0.979 | |

Loading of Organic with Cu

Organic Feed: Final stripped organic(*) from above reaction
Aqueous Feed: 3.79 g/l Cu, 50.5 g/l $NH_3$, ≈22 g/l $CO_2$, pH: 9.83 at 40° C
O/A: 1:20
Temperature: 40° C
Contact Time: 10 minutes

| Organic | | | Aqueous | | |
|---|---|---|---|---|---|
| Co g/l | Cu g/l | $NH_3$ g/l | Cu g/l | $NH_3$ g/l | pH (40° C) |
| 0.0031 | 12.0 | 0.196 | 3.16 | 50.1 | 9.81[6] |

Crowding Cobalt from Organic with Cu

Organic Feed: 1.05 g/l $Co^{+2}$, 2.49 g/l Cu, 0.957 g/l $NH_3$
Aqueous Feed: 3.93 g/l Cu, 116 g/l $NH_3$, ≈22 g/l $CO_2$, pH: 10.44 at 40° C
O/A: 1:20
Temperature: Ambient, Argon atmosphere
Contact Time: 2 minutes

| Organic | | | Aqueous | | | |
|---|---|---|---|---|---|---|
| Co g/l | Cu g/l | $NH_3$ g/l | Co g/l | Cu g/l | $NH_3$ g/l | pH (40° C) |
| 0.239 | 10.8 | 0.478 | 0.0207 | 3.48 | 115 | 10.41 |

TABLE F-7
Cobalt Reduction in LIX 64N with Cuprous (10 g/l) in Ammonia Solution Organic Feed: 1.00 g/l Co loaded 40 v/v% LIX 64N in kerosene
Aqueous Feed: 49.6 g/l $NH_3$, 22.0 g/l $CO_2$, pH: 9.83 at 40° C
Reductant: 9.74 g/l $Cu^+$ — no Cu° present
O/A: 1.0
Temperature: 40° C, Argon atmosphere
Strip Aqueous Feed: 20 v/v% $H_2SO_4$
Strip O/A: 1:2.5

| Sample No. | Time (min) | Aqueous | | | pH (40° C) | Reduced Organic | | | Stripped Organic | | Acid Strip | | |
|---|---|---|---|---|---|---|---|---|---|---|---|---|---|
| | | Co g/l | Cu g/l | $NH_3$ g/l | | Co g/l | Cu g/l | $NH_3$ g/l | Co g/l | Cu g/l | Co g/l | Cu g/l | $NH_3$ g/l |
| 1 | 1 | 0.0013 | 7.75 | — | 9.56 | — | — | — | 0.0046 | 0.825 | 0.347 | 0.561 | 0.811 |
| 2 | 6 | 0.0013 | 7.51 | 42.0 | 9.58 | — | — | — | 0.0029 | 0.880 | 0.296 | 0.593 | — |

Loading of Organic with Cu

Organic Feed: Final stripped organic from above reaction
Aqueous Feed: 3.79 g/l Cu, 50.5 g/l $NH_3$, ≈22 g/l $CO_2$, pH: 9.83 at 40° C
O/A: 1:20
Temperature: 40° C
Contact Time: 10 minutes

| Organic | | | Aqueous | | |
|---|---|---|---|---|---|
| Co g/l | Cu g/l | $NH_3$ g/l | Cu g/l | $NH_3$ g/l | pH (40° C) |
| 0.0013 | 12.3 | 0.202 | 3.23 | 49.9 | 9.81 |

TABLE F-8
Cobalt Reduction in LIX 64N with Cuprous (1 g/l) in Ammonia Solution Organic Feed: 1.00 g/l Co loaded 40 v/v% LIX 64N in kerosene
Aqueous Feed: 49.6 g/l $NH_3$, 22.0 g/l $CO_2$, pH: 9.83 at 40° C
Reductant: 1.42 g/l $Cu^+$
O/A: 1.0
Temperature: 40° C, Argon Atmosphere
Strip Aqueous Feed: 20 v/v% $H_2SO_4$
Strip O/A: 1:2.5

| Sample No. | Time (min) | Aqueous | | | pH (40° C) | Reduced Organic | | | Stripped Organic | | Acid Strip | | |
|---|---|---|---|---|---|---|---|---|---|---|---|---|---|
| | | Co g/l | Cu g/l | $NH_3$ g/l | | Co g/l | Cu g/l | $NH_3$ g/l | Co g/l | Cu g/l | Co g/l | Cu g/l | $NH_3$ g/l |
| 1 | 1 | 0.0003 | 0.287 | — | 9.64 | — | — | — | 0.195 | 0.0099 | 0.237 | 0.430 | — |
| 2 | 6 | 0.0003 | 0.252 | — | 9.63 | — | — | — | 0.209 | 0.0138 | 0.264 | 0.443 | — |
| 3 | 16 | 0.0001 | 0.248 | 39.6 | 9.62 | 1.06 | 1.12 | 1.28 | 0.212 | 0.0245 | 0.276 | 0.467 | 0.993 |

Loading of Organic with Cu

Organic Feed: Final stripped organic from above reaction
Aqueous Feed: 3.79 g/l Cu, 50.5 g/l $NH_3$, ≈22 g/l $Co_2$, pH: 9.83 at 40° C
O/A: 1:20
Temperature: 40° C
Contact Time: 10 minutes

TABLE F-8-continued

| Co g/l | Cu g/l | NH₃ g/l | Cu g/l | NH₃ g/l | pH (40° C) |
|---|---|---|---|---|---|
| 0.255 | 11.7 | 0.138 | 3.20 | 50.1 | 9.81 |

TABLE F-9
Cobalt Reduction in Pilot Plant Recycle LIX 64N with Cuprous (0.18 g/l) in Ammonia Solution Organic Feed: Pilot plant barren organic; 0.0875 g/l Co, 0.490 g/l Cu
Aqueous Feed: 49.6 g/l NH₃, 22.0 g/l CO₂, pH: 9.83 at 40° C
Reductant: 0.178 g/l Cu⁺, ≈0.5 g Cu° turnings present
O/A: 1.0
Temperature: 40° C, Argon atmosphere
Strip Aqueous Feed: 20 v/v% H₂SO₄
Strip O/A: 1:2.5

| Sample No. | Time (min) | Aqueous Co g/l | Aqueous Cu g/l | Aqueous NH₃ g/l | pH (40° C) | Reduced Organic Co g/l | Reduced Organic Cu g/l | Reduced Organic NH₃ g/l | Stripped Organic Co g/l | Stripped Organic Cu g/l | Acid Strip Co g/l | Acid Strip Cu g/l | Acid Strip NH₃ g/l |
|---|---|---|---|---|---|---|---|---|---|---|---|---|---|
| 1 | 1 | <0.0001 | 0.0005 | — | 9.67 | — | — | — | 0.0818 | 0.0035 | 0.0019 | 0.259 | 0.734 |
| 2 | 6 | <0.0001 | 0.0005 | — | 9.69 | — | — | — | 0.0813 | 0.0028 | 0.0019 | 0.261 | — |
| 3 | 19 | N.D. | 0.0008 | 39.6 | 9.66 | 0.0860 | — | 1.57 | 0.0813 | 0.0016 | 0.0018 | 0.265 | — |

Loading of Organic with Cu

Organic Feed: (A) Pilot plant barren organic (blank)
(B) Stripped organic from above reaction
Aqueous Feed: 3.79 g/l Cu, 50.5 g/l NH₃, ≈22 g/l CO₂, pH: 9.83 at 40° C
O/A: 1:20
Temperaure: 40° C
Contact Time: 10 minutes

| Sample | Organic Co g/l | Organic Cu g/l | Organic NH₃ g/l | Aqueous Cu g/l | Aqueous NH₃ g/l | pH (40° C) |
|---|---|---|---|---|---|---|
| A | 0.0858 | 10.8 | 0.233 | 3.26 | 49.9 | 9.84⁵ |
| B | 0.0836 | 10.9 | 0.236 | 3.27 | 50.0 | 9.84⁷ |

TABLE F-10
Cobalt Reduction in Pilot Plant Recycle LIX 64N with Curpous (1 g/l) in Ammonia Solution Organic Feed: Pilot plant barren organic: 0.0875 g/l Co, 0.490 g/l Cu
Aqueous Feed: 49.6 g/l NH₃, 22.0 g/l CO₂, pH: 9.83 at 40° C
Reductant: 1.05 g/l Cu⁺
O/A: 1.0
Temperature: 40° C, Argon atmosphere
Strip Aqueous Feed: 20 v/v% H₂SO₄
Strip O/A: 1:2.5

| Sample No. | Time (min) | Aqueous Co g/l | Aqueous Cu g/l | Aqueous NH₃ g/l | pH (40° C) | Reduced Organic Co g/l | Reduced Organic Cu g/l | Reduced Organic NH₃ g/l | Stripped Organic co g/l | Stripped Organic Cu g/l | Acid Strip Co g/l | Acid Strip Cu g/l | Acid Strip NH₃ g/l |
|---|---|---|---|---|---|---|---|---|---|---|---|---|---|
| 1 | 1 | 0.0001 | 0.454 | — | 9.69 | — | — | — | 0.0285 | 0.0211 | 0.0167 | 0.373 | — |
| 2 | 5 | 0.0002 | 0.391 | 42.7 | 9.69 | 0.0865 | 1.06 | 1.31 | 0.0194 | 0.0420 | 0.0192 | 0.413 | — |

Loading of Organic with Cu

Organic Feed: Final stripped organic from above reaction
Aqueous Feed: 3.79 g/l Cu, 50.5 g/l NH₃, ≈22 g/l CO₂, pH: 9.83 at 40° C
O/A: 1:20
Temperature: 40° C
Contact Time: 10 minutes

| Organic Co g/l | Organic Cu g/l | Organic NH₃ g/l | Aqueous Cu g/l | Aqueous NH₃ g/l | pH (40° C) |
|---|---|---|---|---|---|
| 0.0232 | 11.1 | 0.165 | 3.23 | 50.3 | 9.84 |

TABLE F-11
Cobalt Reduction/Stripping from Pilot Plant Recycle LIX 64N with Copper Metal and Pilot Plant Cu Strip Feed Solution Organic Feed: Pilot plant barren organic; 0.875 g/l Co, 0.490 g/l Cu
Aqueous Feed: Pilot plant synthetic Cu strip feed solution: 36.4 g/l Cu, 0.0096 g/l Co
Reductant: 10 grams Cu°, short turnings (86.4 sq in)
O/A: 1.0
Temperature: 40° C, Argon atmosphere

| Sample No. | Time (min) | Aqueous Co g/l | Aqueous Cu g/l | Organic Co g/l | Organic Cu g/l |
|---|---|---|---|---|---|
| 1 | 1 | 0.0157 | 36.0 | 0.0765 | 0.525 |
| 2 | 5 | 0.0210 | — | 0.0705 | 0.530 |
| 3 | 15 | 0.0273 | — | 0.0620 | 0.535 |
| 4 | 30 | 0.0340 | 36.5 | 0.0588 | 0.540 |
| 5 | 70 | 0.0420 | — | 0.0522 | 0.550 |
| 6 | 130 | 0.0466 | 36.5 | 0.0468 | 0.535 |

Loading of Organic with Cu

Organic Feed: Stripped organic from above reaction
Aqueous Feed: 3.79 g/l Cu, 50.5 g/l NH₃, ≈22 g/l CO₂, pH: 9.83 at 40° C
O/A: 1:20
Temperature: 40° C
Contact Time: 10 minutes

| Organic | | | Aqueous | | pH |
|---|---|---|---|---|---|

TABLE F-11-continued

| Co g/l | Cu g/l | NH₃ g/l | Cu g/l | NH₃ g/l | (40° C) |
|---|---|---|---|---|---|
| 0.0477 | 11.1 | 0.165 | 3.25 | 49.7 | 9.83 |

TABLE F-12

Cobalt Reduction/Stripping from LIX 64N with Copper Metal and Pilot Plant Cu Strip Feed Solution

Organic Feed: 1.00 g/l Co loaded 40 v/v% LIX 64N in kerosene
Aqueous Feed: Pilot plant synthetic Cu strip feed solution; 36.4 g/l Cu, 0.0096 g/l Co
Reductant: 10 grams $Cu^\circ$, short turnings (86.4 sq in)
O/A: 1.0
Temperature: 40° C, Argon Atmosphere

| Sample No. | Time (min) | Aqueous Co g/l | Aqueous Cu g/l | Organic Co g/l | Organic Cu g/l |
|---|---|---|---|---|---|
| 1 | 1 | 0.0346 | 34.4 | 0.970 | 0.420 |
| 2 | 5 | 0.0819 | — | 0.913 | — |
| 3 | 15 | 0.182 | — | 0.815 | — |
| 4 | 50 | 0.474 | — | 0.548 | 0.495 |
| 5 | 120 | 0.846 | 35.7 | 0.172 | 0.570 |

Loading of Organic with Cu

Organic Feed: Stripped organic from above reaction
Aqueous Feed: 3.79 g/l Cu, 50.5 g/l $NH_3$, ≈22 g/l $CO_2$, pH: 9.83 at 40° C
O/A: 1:20
Temperature: 40° C
Contact Time: 10 minutes

| Organic Co g/l | Organic Cu g/l | Organic NH₃ g/l | Aqueous Cu g/l | Aqueous NH₃ g/l | pH (40° C) |
|---|---|---|---|---|---|
| 0.161 | 11.9 | 0.250 | 3.21 | 50.0 | 9.83 |

TABLE F-13

Cobalt Reduction in Pilot Plant Recycle LIX 64N with Cuprous (10 g/l) in Ammonia Solution

Organic Feed: Pilot plant barren organic; 0.0875 g/l Co, 0.490 g/l Cu
Aqueous Feed: 49.6 g/l $NH_3$, 22.0 g/l $CO_2$, pH: 9.83 at 40° C
Reductant: 9.24 g/l $Cu^+$
O/A: 1.0
Temperature: 40° C, Argon atmosphere

| Sample No. | Time (min) | Aqueous Co g/l | Aqueous Cu g/l | Aqueous NH₃ g/l | pH (40° C) | Reduced Organic Co g/l | Reduced Organic Cu g/l | Reduced Organic NH₃ g/l | Stripped Organic Co g/l | Stripped Organic Cu g/l | Acid Strip Co g/l | Acid Strip Cu g/l | Acid Strip NH₃ g/l |
|---|---|---|---|---|---|---|---|---|---|---|---|---|---|
| 1 | 1 | 0.0002 | 7.62 | 38.1 | 9.69 | — | — | — | 0.0050 | 0.550 | 0.0188 | 0.556 | — |
| 2 | 6 | 0.0002 | 7.53 | — | 9.53 | 0.0855 | 2.51 | 1.52 | °0.0027 | 0.605 | 0.0228 | 0.606 | 0.530 |

Loading of Organic with Cu

Organic Feed: Final stripped organic from above reaction
Aqueous Feed: 3.79 g/l Cu, 50.5 g/l $NH_3$, ≈22 g/l $CO_2$, pH: 9.83 at 40° C
O/A: 1:20
Temperature: 40° C
Contact Time: 10 minutes

| Organic Co g/l | Organic Cu g/l | Organic NH₃ g/l | Aqueous Cu g/l | Aqueous NH₃ g/l | pH (40° C) |
|---|---|---|---|---|---|
| 0.0037 | 11.1 | 0.155 | 3.22 | 49.7 | 9.84 |

*See comment on Table F-6

TABLE F-14

LIX Loading Capacity Loss After Reduction

| Table No. | Organic Feed Solution | Blank (g/l Cu) | Total Loading Capacity (g/l Cu)* | Approximate Capacity Loss (%)⁺ |
|---|---|---|---|---|
| F-1 | 1.02 g/l Co - synthetic | 11.9 | 11.4 | 3.8 |
| F-2 | 1.02 g/l Co - synthetic | 11.9 | 11.7 | 1.3 |
| F-3 | 1.02 g/l Co - synthetic | 11.9 | 11.9 | 0 |
| F-4 | 1.02 g/l Co - synthetic | 11.9 | 11.8 | <1.0 |
| F-5 | 1.02 g/l Co - synthetic | 11.9 | 12.3 | −3.6 |
| F-6 | 1.00 g/l Co - synthetic | ≈12.2 | 12.0 | ≈1.6 |
| F-7 | 1.00 g/l Co - syntehtic | ≈12.2 | 12.3 | ≈<−1.0 |
| F-8 | 1.00 g/l Co - synthetic | ≈12.2 | 12.1 | ≈<1.0 |
| F-9 | 0.0875 g/l Co - pilot plant | 10.9* | 11.0 | −1.2 |
| F-10 | 0.0875 g/l Co - pilot plant | 10.9* | 11.1 | −2.2 |
| F-11 | 0.0875 g/l Co - pilot plant | 10.9* | 11.1[8] | −2.5 |
| F-12 | 1.00 g/l Co - synthetic | ≈12.2 | 12.2 | ≈0 |
| F-13 | 0.0875 g/l Co - pilot plant | 10.9 | 11.1 | −1.8 |

*Corrected for cobalt concentration
⁺Negative values indicate increased loading capacity.

Figure 4:
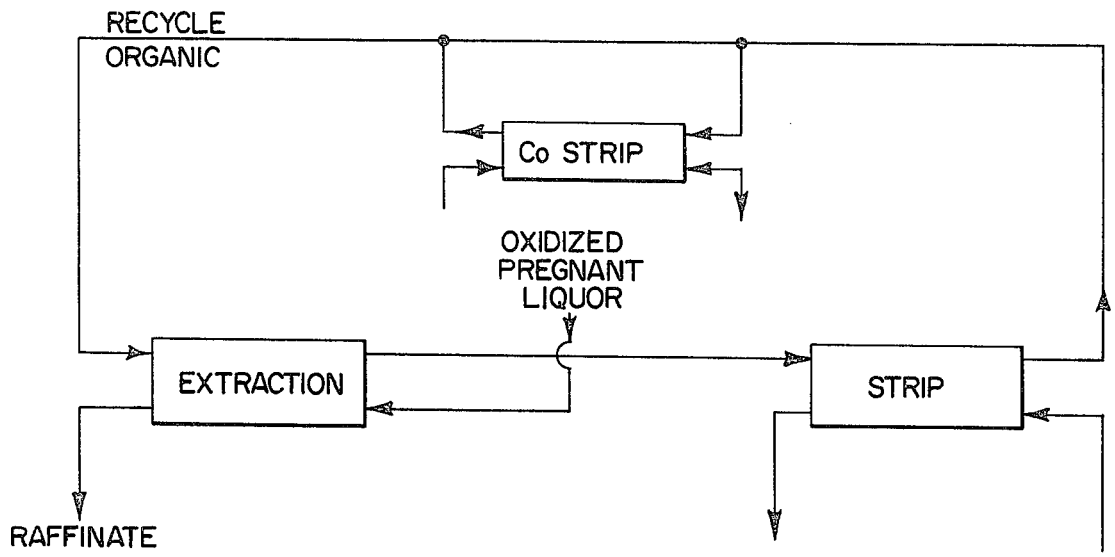
FIG. 4 is a flow sheet showing extractant purification in accordance with the present invention; and, FIG. 5 is a flow sheet showing an alternate embodiment of the invention.

As has been stated above, the broadest concept of the invention is the recognition to strip cobalt while the cobalt is in the reduced state. Perhaps one of the most significant applications of this invention is in purifying recycled organic extractants that have been poisoned with cobalt. A flow sheet for purification of the organic is shown in FIG. 4. If the pregnant liquor contains cobalt and other base metal values, even though the pregnant liquor is oxidized, some of the cobalt will be slowly extracted by the organic; and, the cobalt will tend to build up as the organic is continuously recycled. In accordance with the present invention, a bleed stream of the recycled organic is sent to a cobalt strip circuit where the cobalt is reduced and stripped in accordance with any of the foregoing procedures. A bleed stream comprising 50% of the recycled organic will be sufficient to prevent the poisoning of the organic to a point where it would be unusable.

Figure 5:
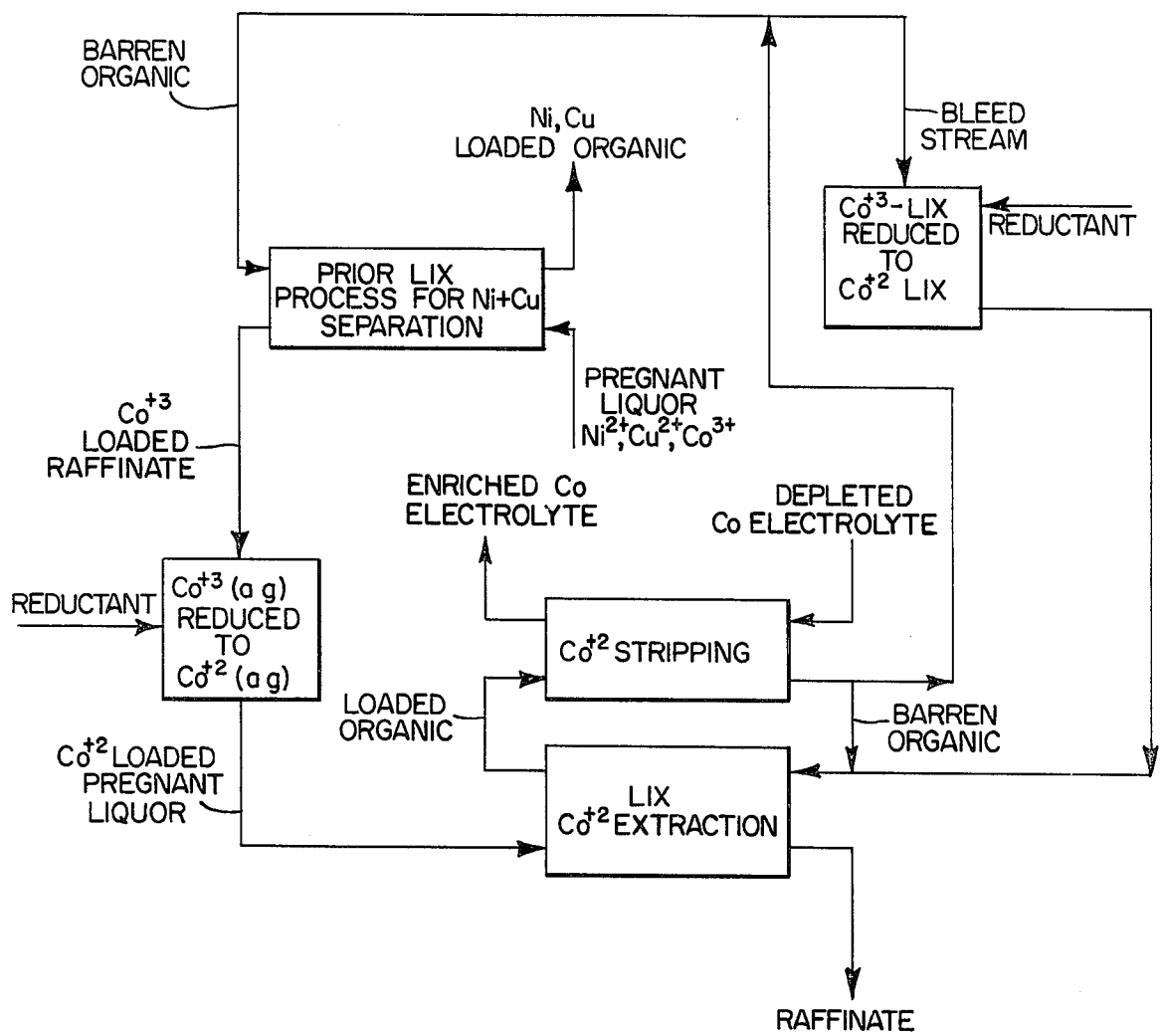

At this point, it should be noted that the invention is not intended to be limited to process shown in FIGS. 1 and 2. Indeed, there are many ways that the broad inventive concept of the present invention can be utilized when treating metal bearing liquor containing cobalt and other metals. In this regard, FIG. 5 is a flow sheet showing another approach in which the present invention is utilized to treat leach liquors containing copper, nickel and cobalt.

Other embodiments of the process include the following schemes:

1. Reducing the leach liquor to render the cobalt extractable and copper substantially unextractable. Thereafter extracting the cobalt, stripping the cobalt while in the reduced state with a dilute mineral acid.

The raffinate is then oxidized to render the copper extractable.

2. Oxidizing the leach liquor and extracting non-cobalt values, thereafter reducing the raffinate with a metal powder, such as cobalt, to reduce the cobalt ions to the divalent state and thereafter extracting the divalent cobalt and stripping the divalent coablt in a non-oxidizing or reducing atmosphere with dilute mineral acid.

3. Stripping an extractant containing reduced cobalt ions by crowding off the cobalt ions with copper and/or nickel ions. This step may be accomplished in a non-oxidizing atmosphere and may be utilized to strip reduced cobalt which has been extracted in accordance with any of the foregoing schemes.

Details of the foregoing embodiments appear below.

The embodiment of the invention in which cobalt and nickel are extracted while in a reduction state with copper being extracted from the oxidized raffinate is discussed below.

Figure 6:
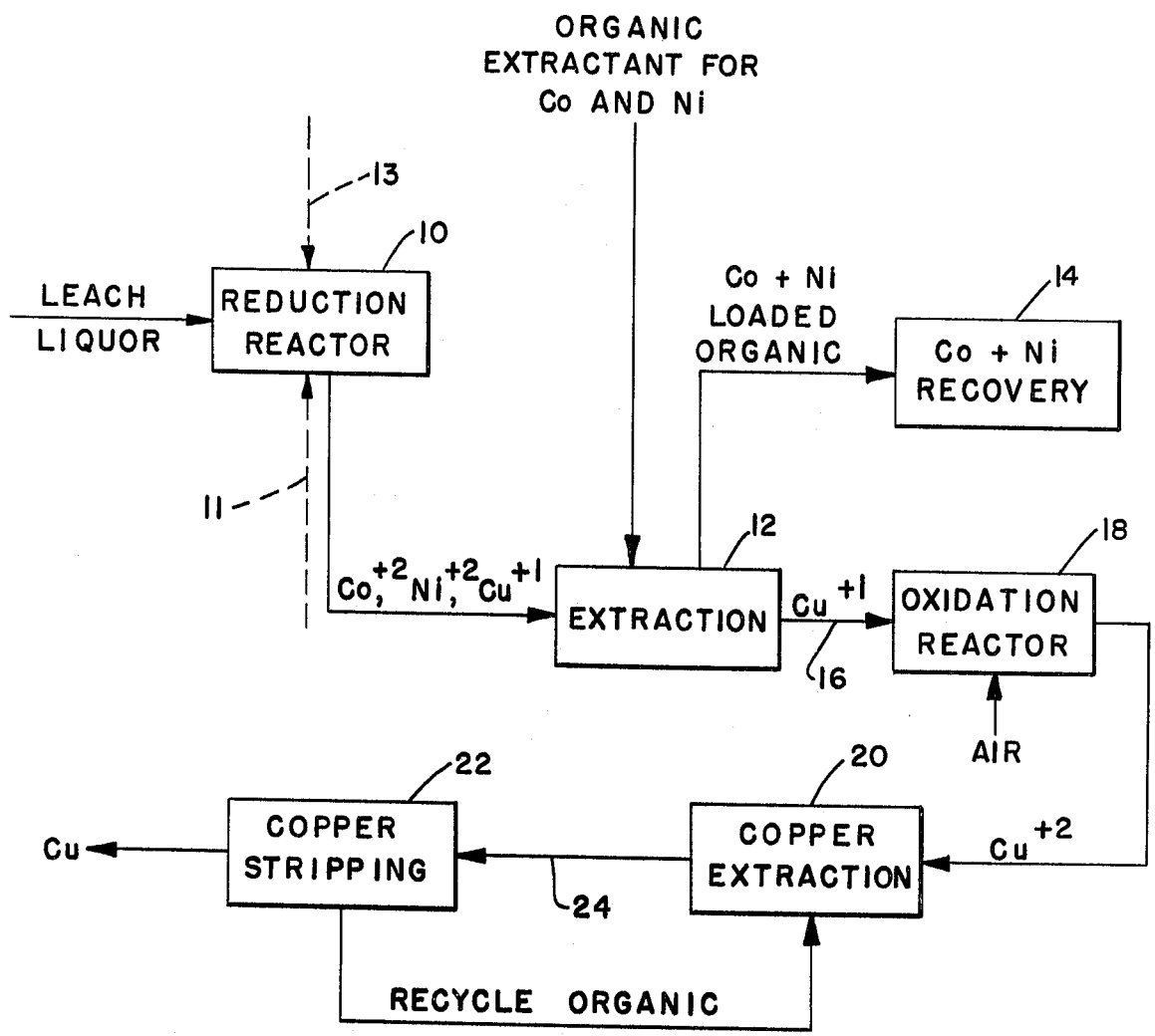
FIG. 6 is a flow sheet showing a further embodiment of the invention.

As is shown in FIG. 6, a leach liquor is reduced in reduction reactor 10 to render the cobalt metal values extractable by placing them in the reduced state. At this point, it should be noted that in the cuprion process, the leached metals exist in the reduced state. In systems where the cobalt does not exist in the reduced state, the leach liquor is reduced in reactor 10. The cobalt may be reduced with a reducing gas, such as a carbon monoxide which is fed along line 11 into reactor 10; or, the trivalent cobalt can be reduced with cobalt powder which is added to reactor 10, as is shown by arrow 13.

In extraction stage 12, the reduced metal values are contacted with an organic oxime extractant to load the cobalt metal values on to the extractant and leave copper values substantially in the raffinate. If the leach liquor also contains nickel, nickel will be co-extracted with the cobalt. The loaded organic is sent to recovery circuit 14. The raffinate 16 which contains copper. values in the +1 valence state is sent to an oxidation reactor 18 where cuprous ions are oxidized to cupric ions.

The cupric ions ($Cu^{++}$) produced in reactor 18 are then sent to a copper extraction circuit 20 where the cupric ions are contacted with an extractant to load the copper values on to the extractant. The copper loaded extractant 24 is stripped in stage 22 to recover copper.

In one example, Ni and Co are extracted into 40v/v% LIX-64 from an ammoniacal leach solution containing 5g/1 $Cu^+$, 6g/1 $Ni^{++}$, and 0.2g/1 $Co^{++}$. Cu is left behind in the raffinate. Ni can then be selectively stripped either with (1) dilute acid for electrowinning and production of Ni cathodes or (2) strong $NH_3$ for production of NiO.

Complete Co extraction for each cycle represents only 0.2g/1 Co. Therefore, continuous cobalt stripping and recovery can be accomplished from an organic bleed stream of only 1/10 the inventory flow. Therefore, after Ni stripping, a 1/10 organic bleed is stripped of 2.2g/1 Co with either (1) the HCl, $Cl^-$ method and cobalt recovered with ammine ion exchange or (2) with the sulfide method and Co recovered by converting it to oxide and gas reducing it to metal.

The Cu solution (Ni + Co barren) lends itself for Cu recovery by (1) direct electrowinning, (2) $H_2$ reduction under pressure, or (3) air oxidation to $Cu^{++}$ followed by conventional extraction, stripping and electrowinning.

The embodiment of the invention in which the leach liquor is reduced to render the cobalt extractable and copper unextractable with the cobalt being separated from the copper and the copper being extracted from the oxidized raffinate is discussed below.

Figure 7:
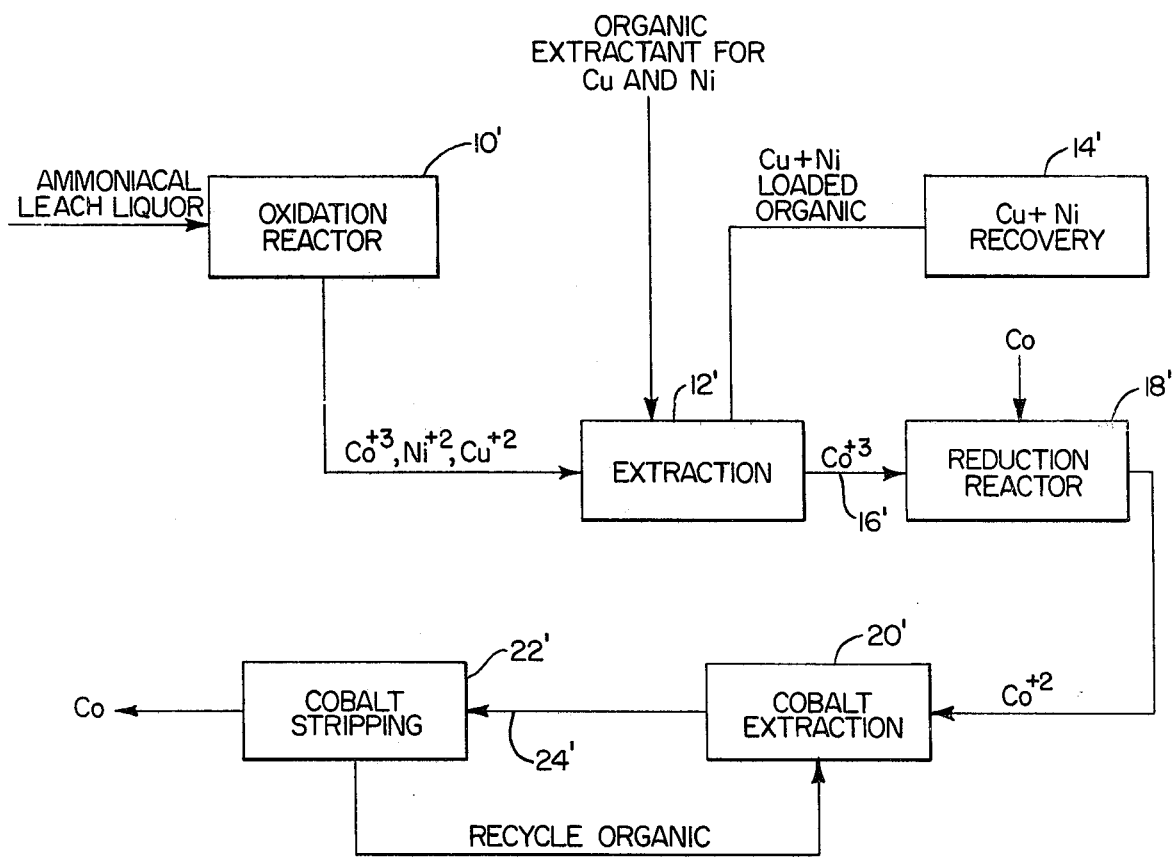
FIG. 7 is a flow chart showing the separation of cobalt from an ammoniacal leach liquor containing cobalt and non-cobalt values in accordance with yet another embodiment of the present invention.

As is shown in FIG. 7, an ammoniacal leach liquor is oxidized in an oxidation reactor 10' to render the non-cobalt metal values extractable by placing them in their highest oxidation state. In extraction stage 12', the oxidized metal values are contacted with an organic extractant to load the non-cobalt metal values such as copper and nickel on to the extractant. The loaded organic is sent to recovery circuit 14'. The raffinate 16' which contains cobalt values in the +3 valence state is sent to a reduction reactor 18'.

In reduction reactor 18', the $Co^{+3}$ is reduced to $Co^{+2}$. In one important embodiment of the invention, the $Co^{+3}$ is reduced with cobalt powder. It is to be noted, however, that the invention is not to be limited to this specific reduction scheme.

The $Co^{+2}$ is then sent to a cobalt extraction circuit 20' where it is contacted with an extractant to load the cobalt values on to the extractant. The cobalt loaded extractant 24' is stripped in stage 22' to recovery cobalt.

In the cuprion process, the pregnant liquor contains various metal values including copper, nickel, cobalt and molybdenum. In the liquod ion exchange separation circuit, the object is to separate the copper, nickel, cobalt and molybdenum from each other and from the pregnant liquor. Initially, the copper and nickel are co-extracted by an organic extractant in a series of mixer/settler units. LIX-64N in a kerosene base may be employed to extractthe copper and nickel.

The organic extractant 140 which contains copper and nickel values is washed with an $NH_4HCO_3$ solution followed by an ammonium sulfate solution to remove ammonia picked up during extraction. This scrubbing operation is carried out in another series of mixer settlers. The organic extractant is then stripped with a weak $H_2SO_4$ solution (pH about 3) to preferentially remove nickel. Thereafter, the copper is stripped, which is accomplished by using a stronger (160 g/1) $H_2SO_4$ solution. The copper and nickel free organic extractant is recycled to the Cu-Ni extraction circuit 42. For complete details of a liquid ion exchange procedure which can be employed to separate the $Cu^{++}$ and $Ni^{++}$ ions from each other and the pregnant liquor, see U.S. Pat. No. 3,853,725 issued Dec. 10, 1974 entitled Selective Stripping Process by Roald R. Skarbo, filed June 28, 1972, the teachings of which are incorporated herein by reference.

Recovery of copper and nickel is accomplished by electrowinning copper and nickel from the solutions 144, 146 prepared as described above. This process is performed on a batch basis for the copper recovery and on a continuous basis for the nickel recovery in a separate plant. The metal containing solutions are transferred once a day.

The raffinate 151 from the copper and nickel extraction stage 142 contains only cobalt, molybdenum and some trace impurities that were not extracted into the organic phase. The cobalt in raffinate 150 is present in the trivalent state, and therefore, is not extractable in extraction stage 142. The raffinate 150 is sent to cobalt reduction stage 152 where it is reduced to the divalent state. In the preferred embodiment of the present invention this is accomplished by adding cobalt metal to reduction reactor 152. The reaction between the cobalt metal and the $Co^{+3}$ ions is stoichiometric. Accordingly, the amount of Co metal that is to be added can easily be determined from the amount of $Co^{+3}$ ions in the raffinate. The aqueous liquor 154 containing the divalent cobalt ions at a concentration of about 0.3 g/l is sent to cobalt extraction stage 156. In stage 156, the aqueous is contacted with LIX-64N in a series of two mixer/settlers. Extraction is achieved using an organic to aqueous ratio of one. The organic extractant loaded with cobalt goes to the cobalt stripping circuit 162 where the organic is contacted in two stages with an aqueous solution of hydrogen sulfide or ammonium sulfide using an organic to aqueous ratio of 3:1. Cobalt in the organic phase reacts with the sulfide to form cobalt sulfide, CoS, which enters the aqueous phase as a precipitate. The CoS is filtered and further processed by conventional technology, for example, by roasting to form the oxide which is then hydrogen reduced to a high purity cobalt powder.

The raffinate 158 from the cobalt extraction circuit is sent to recovery stage 160 for removal of molybdenum. Molybdenum removal may be achieved by precipitation, for example, as calcium molybdate or by the use of a selective ion exchange resin.

Figure 9:
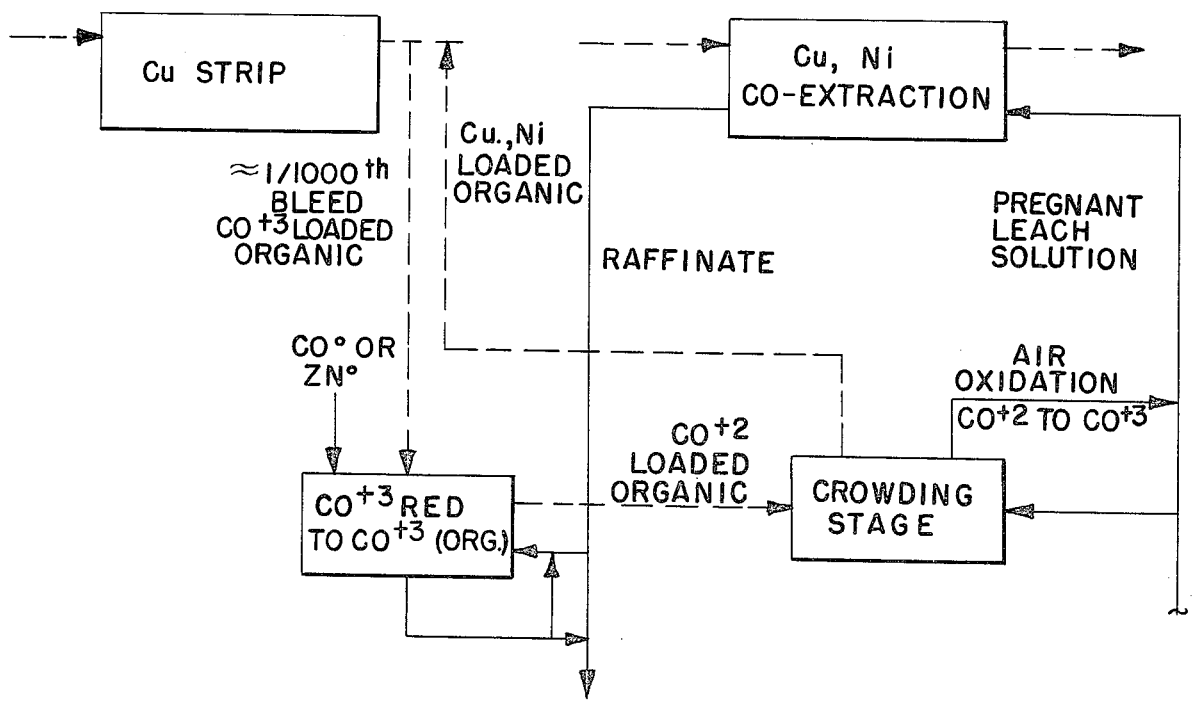

The embodiment of the invention in which cobalt is crowded off the loaded organic by metal ions such as copper and nickel appear below and is shown in FIG. 9. In FIG. 9, the dashed arrows represent the flow of organic extractant and the solid arrows represent the flow of the aqueous phase. The present understanding of the chemistry of cobalt extraction with oximes indicates that the order of chelating stability for copper, nickel and cobalt is as follows:

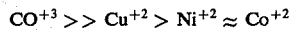

$$Co^{+3} >> Cu^{+2} > Ni^{+2} \approx Co^{+2}$$

This embodiment of the present invention takes advantage of the fact by "crowding" reduced cobalt from the organic with copper and nickel. A convenient source of copper and nickel is pregnant leach solution such as is obtainable from the cuprion process.

Figure 8:
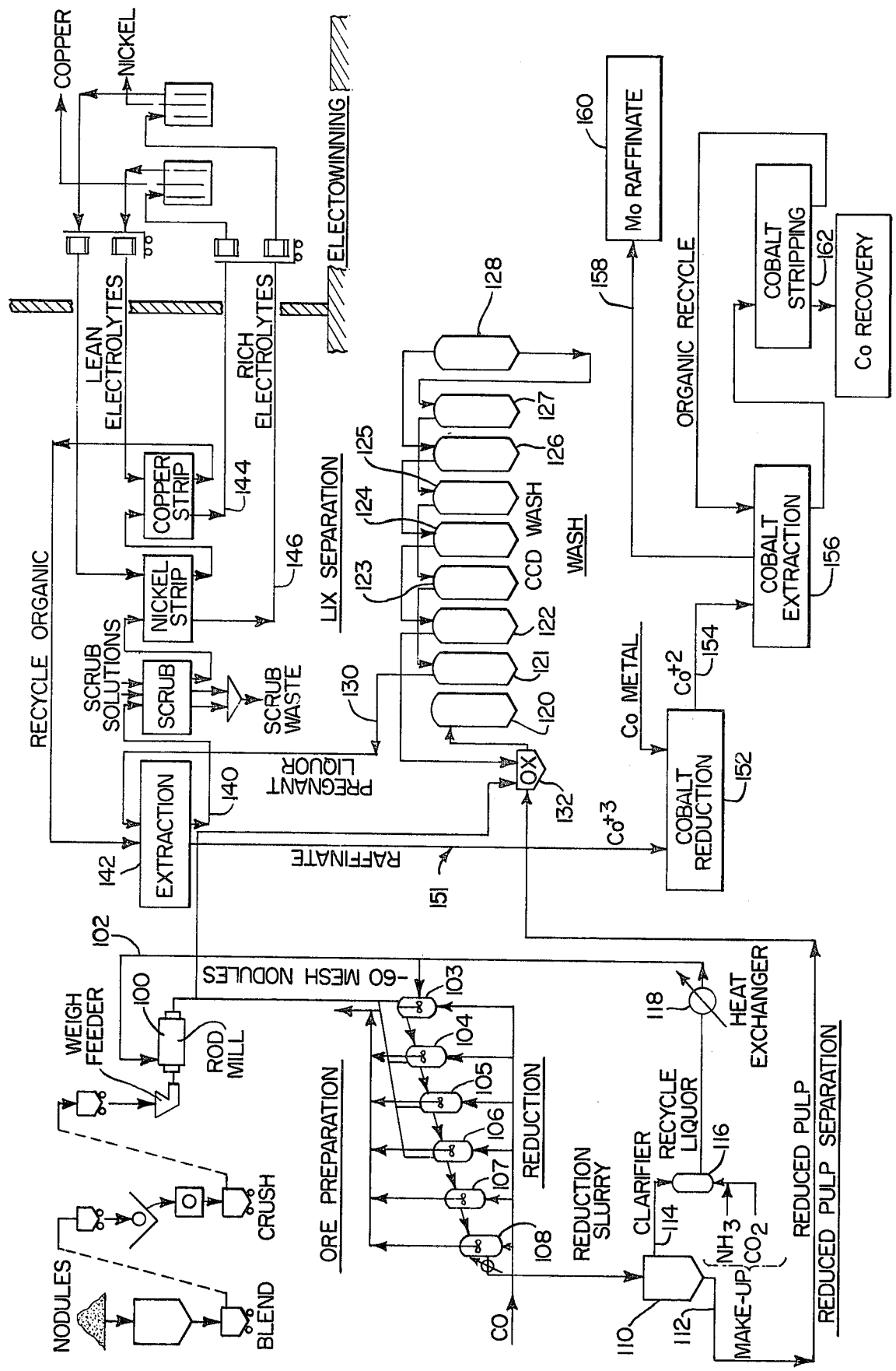
FIG. 8 is a flow chart showing an application of the embodiment of FIG. 7 in the cuprion process; and, FIG. 9 is another flow chart showing an embodiment of the present invention in which reduced cobalt values are crowded off the organic extractant by metal values such as copper and/or nickel.

A significant advantage of utilizing the pregnant leach solution from the cuprion process is that it is a reduction liquor which contains cuprous ions. In accordance with the present invention these cuprous ions act as a reducing agent; and, as the cuprous ions became oxidized to the cupric state, the cupric ions act as a crowding agent. In this embodiment of the invention, a portion of pregnant liquor stream 130 (see FIG. 8)is diverted to cobalt reduction circuit 152 in place of the cobalt metal stream shown in the drawing.

As is shown in FIG. 9, cobalt in the bleed of recycled organic (which will typically contain approximately 1 gram per liter cobalt and 0.6 grams per liter copper) is reduced to $Co^{+2}$ with zinc metal or cobalt metal in the presence of an ammoniacal aqueous solution. The reduced cobalt loaded organic is then contacted with pregnant leach liquor at an organic to aqueous ratio such that sufficient $Cu^{+2}$ and $Ni^{+2}$ is availabe to totally load the organic. $Co^{+2}$ reports to the aqueous phase having been "crowded" from the organic by the copper and nickel. Copper and nickel loaded organic is then returned to the main stream prior to Cu/Ni coextraction. The leach solution bleed is air oxidized to oxidize $Co^{+2}$ to $Co^{+}$ before returning it to the main leach solution stream to prevent cobalt from re-extracting. Thus, cobalt "stripped" from the organic is returned to the raffinate where it is processed by existing means. A significant advantage of this embodiment of the invention is that a small portion of reduction liquor from the cuprion process can be used to strip cobalt. This stream can be oxidized and thrown back into the pregnant liquor. Further details on the "crowding" embodiment of the present invention appear in Table F-2 and F-6 above. Under the conditions given in these tables, 63% of the cobalt was crowded off when contacted for two minutes with 3.79 grams per liter copper, 50 grams per liter $NH_3$ and 77% of the cobalt was crowded off when contacted with 3.79 grams per liter copper and 100 grams per liter $NH_3$.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A process for extracting and stripping cobalt from an ammoniacal leach liquor containing cobalt and other metal values comprising the steps of:
   (a) loading cobalt and other metal values onto an organic extractant while the cobalt is in the reduced divalent state;
   (b) oxidizing the co-loaded organic extractant to place extracted divalent cobalt in the trivalent state;
   (c) contacting the co-loaded organic with a dilute mineral acid to selectively strip the other metal values;
   (d) reducing the cobalt on the organic to the divalent state; and,
   (e) contacting the organic extractant while in a non-oxidizing atmosphere with an aqueous ammoniacal solution containing metal ions selected from the group consisting of $Cu^{+2}$, $Ni^{+2}$ and mixtures thereof to crowd the divalent cobalt from the organic extractant.

2. The process as set forth in claim 1 wherein, in step (a) cobalt and other metal values are loaded onto an oxime extractant.

3. The process as set forth in claim 1 wherein the other metal values are nickel values.

4. A process for purifying an organic extractant which has been poisoned with cobalt comprising the steps of:
   (a) cycling a bleed stream of poisoned organic extractant to a stripping stage; and
   (b) contacting the cobalt in the stripping stage with an aqueous ammoniacal solution containing metal ions selected from the group consisting of $Cu^{+2}$, $Ni^{+2}$ and mixtures thereof while the cobalt is in a reduced divalent state and in a non-oxidizing atmosphere to crowd the cobalt from the organic extractant and purify the poisoned organic extractant.

5. The process as set forth in claim 4 wherein the poisoned organic extractant is an oxime.

6. A process for selectively stripping metal values selected from the group consisting of copper and nickel from an organic extractant which is loaded with cobalt and at least one metal selected from the group consisting of copper and nickel comprising;
   oxidizing the metal values on the organic extractant to place cobalt values on the extractant in the trivalent state;

contacting the organic extractant with a dilute mineral acid to strip the copper or nickel selectively while the cobalt values are in the oxidized trivalent state;

reducing the cobalt on the organic extractant after other metal values have been stripped therefrom to place the cobalt in the divalent state; and, stripping the cobalt from the organic extractant by contacting it while in a non-oxidizing atmosphere with an aqueous ammoniacal solution containing metal ions selected from the group consisting of $Cu^{+2}$, $Ni^{+2}$ and mixtures thereof while the cobalt is in the divalent state to crowd the cobalt off the organic extractant.

7. A process for treating a reduced ammoniacal leach liquor containing cobalt and nickel comprising the following steps:

(a) contacting the reduced leach liquor with an organic extractant to co-load the extractant with cobalt and nickel;

(b) oxidizing the organic extractant to purposely convert the divalent cobalt loaded on the organic extractant to the trivalent state;

(c) stripping the nickel from the organic extractant with a dilute mineral acid;

(d) reducing cobalt ions on the organic extractant to convert the trivalent cobalt to the divalent state; and, (e) contacting the divalent cobalt ions on the organic extractant while in a non-oxidizing atmosphere with an aqueous ammoniacal solution containing an ion selected from the group consisting of $Cu^{++}$, $Ni^{++}$ and mixtures thereof to crowd the cobalt ions off the organic extractant.

8. A process for treating a reduced ammoniacal leach liquor containing copper and nickel and cobalt values comprising the following steps:

(a) oxidizing the leach liquor to convert the copper values to cupric ions;

(b) adding a metallic reductant to the leach liquor to reduce the cobalt values from the trivalent state to the divalent state without reducing the cupric ions;

(c) contacting the leach liquor with an organic extractant to extract copper, nickel and cobalt values;

(d) oxidizing the co-loaded organic extractant to convert the cobalt values to the trivalent state and prevent them from being stripped therefrom;

(e) selectively stripping the nickel and copper from the co-loaded organic extractant;

(f) reducing the trivalent cobalt on the organic extractant to place the cobalt in the divalent state; and, (g) stripping the reduced cobalt values by contacting them while in a non-oxidizing atmosphere with an aqueous ammoniacal solution containing an ion selected from the group consisting of $Cu^{++}$, $Ni^{++}$ and mixture thereof to crowd the cobalt values off the organic extractant.

9. The process as set forth in claim 8 wherein the organic extractant is selected from the group consisting of oximes and quinoline derivatives.

10. The process as set forth in claim 9 wherein, in step (a) and (d) the oxidizing is performed by contacting the values with air.

11. The process as set forth in claim 10 wherein, in step (f), the reductant is selected from the group consisting of cobalt powder, zinc powder, copper powder, nickel powder, iron powder, cuprous ions, stannous ions, manganous ions, ferrous ions, sulfurous acid, and hypophosphorous acid.

12. The process as set forth in claim 11 wherein the reductant is a metal that is in the leach liquor as a metal value and is ultimately recovered in the process.

13. The process as set forth in claim 8 in step (f), wherein the reductant is cuprous ions.

14. The process as set forth in claim 8 wherein the reductant is cobalt powder.

15. The process as set forth in claim 8 wherein in step (g), the solution contains $Cu^{++}$ to crowd the cobalt values off the organic extractant.

16. A process for extracting copper and cobalt from an aqueous ammoniacal leach solution containing copper and cobalt values comprising the following steps:

(a) reducing the ammoniacal leach solution to place the cobalt values in the leach solution in the divalent state and copper values in the monovalent state;

(b) extracting cobalt metal values with an organic extractant, said extractant exhibiting low selectivity for copper values when the copper is in the monovalent state and high selectivity for cobalt metal values when the cobalt metal values are in the divalent state;

(c) separating the organic extractant used in step (b) which is loaded with cobalt metal values from the aqueous ammoniacal leach solution to produce a raffinate containing copper values;

(d) oxidizing the copper values in the raffinate to place the monovalent copper in the divalent state;

(e) contacting the raffinate containing the divalent copper values with an ion extractant which is capable of extracting copper ions when in the divalent state;

(f) separating the copper loaded ion extractant used in step (e) from the aqueous ammoniacal solution;

(g) recovering copper from the copper loaded ion extractant separated in step (f); and, (h) contacting the organic extractant loaded with divalent cobalt after the separation of step (c) while in a non-oxidizing atmosphere with an aqueous ammoniacal solution containing an ion selected from the group consisting of $Cu^{+2}$, $Ni^{+2}$ and mixtures thereof while the cobalt on the organic extractant is in a reduced divalent state to crowd the cobalt off the extractant.

17. The process as set forth in claim 16 wherein, in step (b), the cobalt metal values are extracted with an organic oxime extractant.

18. The process as set forth in claim 16 wherein, in step (e), the copper metal values are extracted with an ion extractant selected from the group consisting of oximes and 8-hydroxyquinoline derivatives.

19. The process as set forth in claim 16 wherein, in step (b), the cobalt metal values are extracted with an oxime selected from the group consisting of 2-hydroxy-4-nonyl-benzophenoxime, 5,8-diethyl-7-hydroxy-6-dodecanoneoxime and 2-hydroxy-4-dodecyl-benzophenoxime.

20. The process as set forth in claim 16 wherein, in step (e), the copper metal values are extracted with an oxime selected from the group consisting of 2-hydroxy-4-nonyl-benzophenoxime, 5,8-diethyl-7-hydroxy-6-dodecanoneoxime and 2-hydroxy-4-dodecyl-benzophenoxime.

21. The process as set forth in claim 16 wherein the same extractant is used to extract cobalt metal values in step (b) and copper values in step (e).

22. The process as set forth in claim 16 wherein the aqueous ammoniacal leach solution contains copper, nickel and cobalt and wherein cobalt and nickel are extracted in step (b).

23. The process as set forth in claim 22 wherein, in step (b), the cobalt and nickel metal values are extracted with an oxime.

24. The process as set forth in claim 22 wherein, in step (b), the cobalt and nickel metal values are extracted with an oxime selected from the group consisting of 2-hydroxy-4-nonylbenzophenoxime, 5,8-diethyl-7-hydroxy-6-dodecanoeoxime and 2-hydroxy-4-dodecyl-benzophenoxime.

25. In a process in which manganese nodules are treated with an ammoniacal leach solution containing cuprous ions to reduce the manganese oxides in the nodules to enable copper, nickel and cobalt values contained therein to be leached and thereafter recovered by solvent extraction wherein the improvement comprises:
(a) extracting cobalt and nickel metal values with an organic extractant from said ammoniacal leach solution while said cobalt values are in a divalent state and said copper values are in a monovalent state, said extractant exhibiting low selectivity for copper values when the copper is in the monovalent state and high selectivity for cobalt and nickel metal values when the cobalt and nickel metal values are in a divalent state;
(b) separating the organic extractant used in step (a) which is loaded with cobalt and nickel metal values from the aqueous ammoniacal leach solution to produce a raffinate containing copper values;
(c) oxidizing the copper values in the raffinate to place the monovalent copper in the divalent state;
(d) contacting the raffinate containing the divalent copper values with an ion extractant which is capable of extracting copper ions when in the divalent state;
(e) separating the copper loaded ion extractant used in step (d) from the aqueous ammoniacal solution;
(f) recovering copper from the copper loaded ion extractant separated in step (e);
(g) oxidizing the organic extractant separated in step (b) to place the cobalt values in the trivalent state;
(h) stripping the nickel values from the oxidized extractant of step (g) with a dilute mineral acid; and,
(i) contacting the extractant stripped of nickel in step (h) with an aqueous ammoniacal solution containing a metal selected from the group consisting of $Cu^{+2}$, $Ni^{+2}$ and mixtures thereof while the cobalt is in a reduced divalent state and in a non-oxidizing atmosphere to crowd the cobalt off the organic extractant.

26. The process as set forth in claim 25 wherein, in step (a), the cobalt and nickel metal values are extracted with an organic extractant selected from the group consisting of oximes and 8-hydroxyquinoline derivatives.

27. The process as set forth in claim 26 wherein, in step (d), the copper metal values are extracted with an organic extractant selected from the group consisting of oximes and 8-hydroxyquinoline derivatives.

28. The process as set forth in claim 25 wherein, in step (a), the cobalt and nickel metal values are extracted with an oxime selected from the group consisting of 2-hydroxy-4-nonylbenzophenoxime, 5,8-diethyl-7-hydroxy-6-dodecanoneoxime, 2-hydroxy-4-dodecylbenzophenoxime and mixtures thereof.

29. The process as set forth in claim 28 wherein, in step (d), the copper metal values are extracted with an oxime selected from the group consisting of 2-hydroxy-4-nonyl-benzophenoxime, 5,8-diethyl-7-hydroxy-6-dodecanoneoxime and 2-hydroxy-4-dodecyl-benzophenoxime and mixtures thereof.

30. The process as set forth in claim 25 wherein the same extractant is used to extract cobalt and nickel metal values in step (a) and copper values in step (d).

31. A process for extracting cobalt from an aqueous ammoniacal leach solution containing cobalt and non-cobalt metal values comprising the following steps:
(a) oxidizing the ammoniacal leach solution to place the metal values in the leach solution in their highest oxidation state, the cobalt values being oxidized to the trivalent state;
(b) extracting non-cobalt metal values with an organic extractant, said organic extractant exhibiting low selectivity for cobalt values when the cobalt is in the trivalent state and high selectivity for non-cobalt metal values when the non-cobalt metal values are in a high oxidation state;
(c) separating the organic extractant used in step (b) which is loaded with non-cobalt metal values from the aqueous ammoniacal leach solution to produce a raffinate containing cobalt values;
(d) reducing the cobalt values in the raffinate to place the trivalent cobalt in the divalent state;
(e) contacting the raffinate containing the divalent cobalt values with an ion extractant which is capable of extracting cobalt ions when in the divalent state;
(f) separating the cobalt loaded ion extractant used in step (e) from the aqueous ammoniacal solution; and,
(g) crowding cobalt from the cobalt loaded ion extractant separated in step (f) by contacting the extractant while in a non-oxidizing atmosphere with an aqueous ammoniacal solution containing a metal ion selected from the group consisting of $Cu^{+2}$, $Ni^{+2}$ and mixtures thereof.

32. The process as set forth in claim 31 wherein, in step (d), the trivalent cobalt values are reduced to the divalent state with cobalt metal.

33. The process as set forth in claim 32 wherein, in step (b), the non cobalt metal values are extracted with an organic extractant selected from the group consisting of oximes and 8-hydroxyquinoline derivatives.

34. The process as set forth in claim 32 wherein, in step (b), the non cobalt metal values are extracted with an oxime selected from the group consisting of 2-hydroxy-4-nonylbenzophenoxime, 5,8-diethyl-7-hydroxy-6-dodecanoneoxime and 2-hydroxy-4-dodecylbenzophenoxime.

35. The process as set forth in claim 32 wherein the same extractant is used to extract non cobalt metal values in step (b) and cobalt values in step (e).

36. The process as set forth in claim 32 wherein the aqueous ammoniacal leach solution contains copper, nickel and cobalt and wherein copper and nickel are extracted in step (b).

37. The process as set forth in claim 31 wherein, in step (b), the non cobalt metal values are extracted with an organic extractant selected from the group consisting of oximes and 8-hydroxyquinoline derivatives.

38. The process as set forth in claim 31 wherein, in step (b), the non cobalt metal values are extracted with an oxime selected from the group consisting of 2-hydroxy-4-nonyl-benzophenoxime, 5,8-diethyl-7-hydroxy-6-dodecanoneoxime and 2-hydroxy-4-dodecylbenzophenoxime.

39. The process as set forth in claim 31 wherein the same extractant is used to extract non cobalt metal values in step (b) and cobalt values in step (e).

40. The process as set forth in claim 31 wherein the aqueous ammoniacal leach solution contains copper, nickel and cobalt and wherein copper, and nickel are extracted in step (b).

41. In a process in which manganese nodules are treated with an ammoniacal leach solution containing cuprous ions to enable copper, nickel and cobalt values contained therein to be leached and thereafter recovered by solvent extraction wherein the improvement comprises:
(a) oxidizing the ammoniacal leach solution containing copper, nickel and cobalt values to place these metal values in their highest oxidation state, the cobalt values being oxidized to the trivalent state;
(b) extracting copper and nickel metal values with an organic extractant, said extractant exhibiting low selectivity for cobalt values when the cobalt is in the trivalent state and high selectivity for copper and nickel metal values when the copper and nickel metal values are in a high oxidation state;
(c) separating the organic extractant used in step (b) which is loaded with copper and nickel metal values from the aqueous ammoniacal leach solution to produce a raffinate containing cobalt values;
(d) reducing the cobalt values in the raffinate to place the trivalent cobalt in the divalent state;
(e) contacting the raffinate containing the divalent cobalt values with an ion extractant which is capable of extracting cobalt ions when in the divalent state;
(f) separating the cobalt loaded ion extractant used in step (e) from the aqueous ammoniacal solution; and
(g) crowding cobalt from the cobalt loaded ion extractant separated in step (f) by contacting the extractant while in a non-oxidizing atmosphere with an aqueous ammoniacal solution containing a metal ion selected from the group consisting of $Cu^{+2}$, $Ni^{+2}$ and mixtures thereof.

42. The process as set forth in claim 41 wherein, in step (d), the trivalent cobalt values are reduced to the divalent state with cobalt metal.

43. The process as set forth in claim 42 wherein, in step (b), the non cobalt metal values are extracted with an organic extractant selected from the group consisting of oximes and 8-hydroxyquinoline derivatives.

44. The process as set forth in claim 42 wherein, in step (b), the copper and nickel metal values are extracted with an oxime selected from the group consisting of 2-hydroxy-4-nonylbenzophenoxime, 5,8-diethyl-7-hydroxy-6-dodecanoneoxime and 2-hydroxy-4-dodecylbenzophenoxime.

45. The process as set forth in claim 42 wherein the same extractant is used to extract copper and nickel metal values in step (b) and cobalt values in step (e).

46. The process as set forth in claim 41 wherein, in step (b), the copper and nickel metal values are extracted with an organic extractant selected from the group consisting of oximes and 8-hydroxyquinoline derivatives.

47. The process as set forth in claim 41 wherein, in step (b), the copper and nickel metal values are extracted with an oxime selected from the group consisting of 2-hydroxy-4-nonylbenzophenoxime, 5,8-diethyl-7-hydroxy-6-dodecanoneoxime and 2-hydroxy-4-dodecylbenzophenoxime.

48. The process as set forth in claim 41 wherein the same extractant is used to extract copper and nickel metal values in step (b) and cobalt values in step (e).

* * * * *